US006785768B2

(12) United States Patent
Peters et al.

(10) Patent No.: US 6,785,768 B2
(45) Date of Patent: Aug. 31, 2004

(54) COMPUTER SYSTEM AND PROCESS FOR TRANSFERRING STREAMS OF DATA BETWEEN MULTIPLE STORAGE UNITS AND MULTIPLE APPLICATIONS IN A SCALABLE AND RELIABLE MANNER

(75) Inventors: Eric C. Peters, Carlisle, MA (US); Stanley Rabinowitz, Westford, MA (US); Herbert R. Jacobs, Hudson, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 10/145,495

(22) Filed: May 14, 2002

(65) Prior Publication Data

US 2002/0162047 A1 Oct. 31, 2002

Related U.S. Application Data

(60) Division of application No. 09/724,327, filed on Nov. 28, 2000, now Pat. No. 6,449,688, which is a continuation of application No. 09/549,841, filed on Apr. 14, 2000, now abandoned, which is a continuation of application No. 09/054,761, filed on Apr. 3, 1998, now Pat. No. 6,374,336, which is a continuation of application No. 09/006,070, filed on Jan. 12, 1998, now Pat. No. 6,415,373, which is a continuation of application No. 08/997,769, filed on Dec. 24, 1997, now abandoned, and a continuation of application No. 09/549,841, filed on Apr. 14, 2000, now abandoned, which is a continuation of application No. 09/054,761, filed on Apr. 3, 1998, now abandoned, which is a continuation of application No. 09/006,070, filed on Jan. 12, 1998, now abandoned, which is a continuation of application No. 08/997,769, filed on Dec. 24, 1997, now abandoned, and a continuation of application No. 09/054,761, which is a continuation of application No. 09/006,070, which is a continuation of application No. 08/997,769, and a continuation of application No. 09/006,070, which is a continuation of application No. 08/997,769, and a continuation of application No. 08/997,769.

(51) Int. Cl.[7] ........................ G06F 12/00; G06F 13/372

(52) U.S. Cl. ....................... 711/112; 711/170; 709/233; 725/92; 707/205

(58) Field of Search ................................ 711/170, 112, 711/100, 114, 4; 725/92, 93, 97, 96; 709/104, 106, 105, 225, 226, 230, 231, 233; 707/205

(56) References Cited

U.S. PATENT DOCUMENTS

| | | | | |
|---|---|---|---|---|
| 4,887,204 | A | 12/1989 | Johnson et al. | 707/10 |
| 5,262,875 | A | 11/1993 | Mincer et al. | 386/101 |
| 5,333,299 | A | 7/1994 | Koval et al. | 713/400 |
| 5,371,852 | A | 12/1994 | Attanasio et al. | 709/245 |
| 5,394,526 | A | 2/1995 | Crouse et al. | 709/219 |
| 5,420,984 | A | 5/1995 | Good et al. | 710/22 |
| 5,423,037 | A | 6/1995 | Hvasshovd | 707/202 |
| 5,434,994 | A | 7/1995 | Shaheen et al. | 709/223 |
| 5,442,749 | A | 8/1995 | Northcutt et al. | 709/219 |
| 5,463,765 | A | 10/1995 | Kakuta et al. | 714/6 |
| 5,473,362 | A | 12/1995 | Fitzgerald et al. | 725/92 |
| 5,485,474 | A | 1/1996 | Rabin | 714/762 |
| 5,508,732 | A | 4/1996 | Bottomley et al. | 725/93 |
| 5,510,905 | A | 4/1996 | Birk | 386/125 |
| 5,517,652 | A | 5/1996 | Miyamoto et al. | 725/115 |
| 5,521,630 | A | 5/1996 | Chen et al. | 725/90 |
| 5,526,132 | A | 6/1996 | Tsubota et al. | 386/52 |
| 5,537,408 | A | 7/1996 | Branstad et al. | 370/473 |
| 5,537,533 | A | 7/1996 | Staheli et al. | 714/5 |
| 5,542,087 | A | 7/1996 | Neimat et al. | 709/234 |
| 5,544,327 | A | 8/1996 | Dan et al. | 709/234 |
| 5,544,347 | A | 8/1996 | Yanai et al. | 711/162 |
| 5,546,118 | A | 8/1996 | Ido | 725/115 |
| 5,550,577 | A | 8/1996 | Veriest et al. | 725/92 |
| 5,550,982 | A | 8/1996 | Long et al. | 725/93 |
| 5,553,005 | A | 9/1996 | Voeten et al. | 711/112 |
| 5,555,244 | A | 9/1996 | Gupta et al. | 370/397 |
| 5,555,404 | A | 9/1996 | Torbjørnsen et al. | 767/202 |
| 5,559,549 | A | 9/1996 | Hendricks et al. | 725/50 |
| 5,559,641 | A | 9/1996 | Kajimoto et al. | 386/56 |
| 5,559,764 | A | 9/1996 | Chen et al. | 709/217 |
| 5,559,808 | A | 9/1996 | Kostreski et al. | 370/517 |
| 5,559,984 | A | 9/1996 | Nakano et al. | 711/121 |
| 5,566,297 | A | 10/1996 | Devarakonda et al. | 714/15 |
| 5,574,845 | A | 11/1996 | Benson et al. | 345/418 |
| 5,581,784 | A | 12/1996 | Tobagi et al. | 710/6 |
| 5,583,561 | A | 12/1996 | Baker et al. | 725/93 |
| 5,583,868 | A | 12/1996 | Rashid et al. | 370/394 |
| 5,585,852 | A | 12/1996 | Agarwal | 375/240.11 |
| 5,586,264 | A | 12/1996 | Belknap et al. | 725/115 |
| 5,592,612 | A | 1/1997 | Birk | 714/6 |
| 5,592,626 | A | 1/1997 | Papadimitriou et al. | 709/102 |

AUDIO BUFFERS
READ 291
298
WRITE
294
VIDEO BUFFERS
READ
WRITE 293
WRITE 295
TIME
292
290
296
BUFFER
TIME
297

| | | | | |
|---|---|---|---|---|
| 5,594,924 A | | 1/1997 | Ottesen et al. | 710/31 |
| 5,610,841 A | | 3/1997 | Tanaka et al. | 725/115 |
| 5,623,690 A | | 4/1997 | Palmer et al. | 715/500.1 |
| 5,642,171 A | | 6/1997 | Baumgartner et al. | 348/515 |
| 5,644,720 A | | 7/1997 | Boll et al. | 709/227 |
| 5,647,047 A | | 7/1997 | Nagasawa | 386/52 |
| 5,684,963 A | | 11/1997 | Clement | 705/26 |
| 5,692,128 A | | 11/1997 | Bolles et al. | 709/224 |
| 5,694,334 A | | 12/1997 | Donahue et al. | 709/247 |
| 5,712,976 A | | 1/1998 | Falcon, Jr. et al. | 725/115 |
| 5,732,239 A | | 3/1998 | Tobagi et al. | 711/114 |
| 5,734,925 A | | 3/1998 | Tobagi et al. | 710/6 |
| 5,737,595 A | | 4/1998 | Cohen et al. | 707/100 |
| 5,737,747 A | | 4/1998 | Vishlitzky et al. | 711/118 |
| 5,754,882 A | | 5/1998 | Tobagi et al. | 710/6 |
| 5,757,415 A | | 5/1998 | Asamizuya et al. | 725/114 |
| 5,768,681 A | | 6/1998 | Dan et al. | 725/95 |
| 5,799,174 A | | 8/1998 | Muntz et al. | 345/540 |
| 5,829,046 A | | 10/1998 | Tzelnic et al. | 711/162 |
| 5,862,312 A | | 1/1999 | Mann et al. | 714/6 |
| 5,893,086 A | | 4/1999 | Schmuck et al. | 709/219 |
| 5,915,094 A | | 6/1999 | Kouloheris et al. | 725/94 |
| 5,920,702 A | | 7/1999 | Bleidt et al. | 709/231 |
| 5,926,649 A | | 7/1999 | Ma et al. | 710/6 |
| 5,933,603 A | | 8/1999 | Vahalia et al. | 709/225 |
| 5,940,838 A | | 8/1999 | Schmuck et al. | 707/200 |
| 5,940,841 A | | 8/1999 | Schmuck et al. | 707/205 |
| 5,946,686 A | | 8/1999 | Schmuck et al. | 707/10 |
| 5,949,948 A | * | 9/1999 | Krause et al. | 386/6 |
| 5,950,015 A | | 9/1999 | Korst et al. | 455/3.02 |
| 5,950,199 A | | 9/1999 | Schmuck et al. | 707/8 |
| 5,956,734 A | | 9/1999 | Schmuck et al. | 707/205 |
| 5,960,446 A | | 9/1999 | Schmuck et al. | 707/205 |
| 5,963,963 A | | 10/1999 | Schmuck et al. | 707/205 |
| 5,974,424 A | | 10/1999 | Schmuck et al. | 707/201 |
| 5,987,477 A | | 11/1999 | Schmuck et al. | 707/201 |
| 5,996,089 A | | 11/1999 | Mann et al. | 714/6 |
| 5,999,976 A | | 12/1999 | Schmuck et al. | 709/226 |
| 6,016,166 A | * | 1/2000 | Huang et al. | 348/515 |
| 6,021,408 A | | 2/2000 | Ledain et al. | 707/8 |
| 6,021,508 A | | 2/2000 | Schmuck et al. | 714/4 |
| 6,023,706 A | | 2/2000 | Schmuck et al. | 707/200 |
| 6,032,216 A | | 2/2000 | Schmuck et al. | 710/200 |
| 6,047,309 A | | 4/2000 | Dan et al. | 709/201 |
| 6,061,732 A | | 5/2000 | Korst et al. | 709/231 |
| 6,070,191 A | | 5/2000 | Narendran et al. | 709/226 |
| 6,112,223 A | | 8/2000 | Chadwick et al. | 709/201 |
| 6,134,596 A | | 10/2000 | Bolosky et al. | 709/233 |
| 6,138,221 A | | 10/2000 | Korst et al. | 711/167 |
| 6,160,547 A | | 12/2000 | Roth | 345/723 |
| 6,185,621 B1 | | 2/2001 | Romine | 709/231 |
| 6,282,155 B1 | * | 8/2001 | Takahashi et al. | 369/30.23 |
| 6,374,336 B1 | | 4/2002 | Peters et al. | 711/167 |
| 6,415,373 B1 | | 7/2002 | Peters et al. | 711/167 |
| 6,449,688 B1 | | 9/2002 | Peters et al. | 711/112 |

FOREIGN PATENT DOCUMENTS

| | | |
|---|---|---|
| EP | 0657801 A | 6/1995 |
| EP | 0 701 198 | 3/1996 |
| EP | 0 740 247 | 10/1996 |
| EP | 0767585 A | 4/1997 |
| GB | 2299424 A | 10/1996 |
| GB | 2 312 316 | 10/1997 |
| GB | 2 312 317 | 10/1997 |
| GB | 2 312 318 | 10/1997 |
| GB | 2 312 319 | 10/1997 |
| WO | WO 98/10586 | 3/1998 |

OTHER PUBLICATIONS

"Method to Deliver Scalable Video Across a Distributed Computer System", IBM Technical Disclosure, Page(s) 251–256, May 1994.*

Adam, Joel F., et al., "A Network Architecture for Distributed Multimedia Systems", Proc. IEEE Intl. Conf. Multimedia, 1994, pp. 76–85.

Alemany, Juan, et al., "Random Striping for News on Demand Servers," Dept. of Computer Science & Engineering, University of Washington, Feb. 1997,pp. 1–15.

Anderson, David P., "Real–time Disk Storage and Retrieval of Digital Audio/Video Data," Computer Science Div., University of California at Berkeley, Aug. 8, 1991, pp. 1–26.

Anderson, David P., "Meta–Scheduling for Distributed Continuous Media," Computer Science Division, University of California at Berkeley, Oct. 4, 1990, pp. 1–32.

Asami, Satoshi et al., "The Design of Large–Scale, Do–It–Yourself RAIDs," Nov. 10, 1995, pp. 1–30.

Baker, Mary, et al, "Availability in the Sprite Distributed File System", in Operating Systems Review, Apr. 1991, 4 pages.

Bartal, Yair, et al., "The Distributed k–Server Problem—A Competitive Distributed Translator For k–Server Algorithms", 1992 IEEE, pp. 344–353.

Berson, Steven, et al, "Randomized Data Allocation for Real–time Disk I/O", Compcon 96, pp. 286–290, 1996.

Bestavros, Azer, "An Adaptive Information Dispersal Algorithm for Time–Critical Reliable Communication", In Network Mgmt. and Control, vol. II, pp. 423–438, Plenum Pub., 1994.

Birk, Yitzhak, "Determining Load–Balancing Schemes for Disk–Based Video–On–Demand Storage Servers", Israel Institute of Technology, 1995 IEEE, pp. 17–25.

Birk, Yitzhak, "Random RAIDs with Selective Exploitation of Redundancy for Higher Performance Video Servers", EE Department, Israel Institute of Technology, 1997 IEEE, pp. 13–23.

Bohossian, Vasken, et al., "Computing in the RAIN: A Reliable Arry of Independent Nodes," California Institute of Technology, Dec. 3, 1998, pp. 1–19.

Bolosky, William J., et al., "The Tiger Video Fileserver," Technical Report, Sixth International Workshop on Network and Operating System Support for Digial Audio and Video, Apr., 1996.

Brinkmann, André, et al., "Efficient, Distributed Data Placement Strategies for Storage Area Networks"(Date Unknown).

Brubeck, David W., et al., "Hierarchical Storage Management in a Distributed VOD System", University of California at Berkeley, IEEE Multimedia, Fall 1996, pp. 37–47.

Buddhikot, Milind M., et al., "Design of a Large Scale Multimedia Storage Server", Computer Networks and ISDN Systems 27, 1994, pp. 503–517.

Cabrera, Luis–Felipe, et al, "Swift: Using Distributed Disk Stripping to Provide High I/O Data Rates", Computing Systems 4, Fall 1991, pp. 405–436.

Chen, Peter M., et al., "RAID: High–Performance, Reliable Secondary Storage", ACM Computing Surveys, vol. 26, No. 2, Jun. 1994, pp. 146–185.

Devarakonda, Murthy, et al, "Recovery in the Calypso File System", ACM Transactions on Computer Systems, vo. 14, No. 3, Aug. 1996, pp. 287–310.

Gifford, David K., et al, "The Cedar File System," Communications of the ACM, vol. 31, No. 3, Mar. 1998, pp. 288–298.

The Computer Science and Engineering Handbook; A CRC Handbook, 1997, pp. 1851–1869.

Copeland, George, et al., "Data Placement in Bubba", ACM, 1988, pp. 99–108.

Coyne, Robert A., et al., "Storage Systems for National Information Assets", Lawrence Livermore National Laboratory, IEEE, 1992, pp. 626–633.

Dan, Asit, et al., "Buffering and Caching in Large–Scale Video Servers", IBM Research Division, Compcon, 1995.

Dannengberg, Roger B., et al., "A Comparison of Streams and Time Advance As Paradigms For Multimedia Systems," Carnegie Mellon Information Technolgy Center, Mar. 1994, pp. i–18.

Dias, Daniel M., et al., "A Scalable and Highly Available Web Server", IBM Research Division, Proc. IEEE, Compcon 1996, pp. 85–92.

Dibble, Peter C., et al., "Bridge: A High–Performance File System for Parallel Process", Proc. 8$^{th}$ Intl. Conf. Dist. Comp. Sys., Jun. 1988, pp. 154–161.

Drapeau, Ann L., et al., "Striped Tape Arrays", Twelfth IEEE Symposium on Mass Storage Systems, 1993, pp. 257–265.

Elnozahy, E.N., "Storage Strategies for Fault–Tolerant Video Servers,"Carnegie Mellon University, Aug. 1996, pp. 1–11.

Encyclopedia of Computer Science, Third Edition, 1993, "Distributed Systems," pp. 476–555, "Network Architecture," pp. 920–929, "Operating Systems," pp. 966–989.

Escobar–Molano, Martha L., "An Optimal Resource Scheduler for Continuous Display of Structured Video Objects," IEEE Transactions on Knowledge and Data Engineering, vol. 8, No. 3, Jun. 1996, pp. 508–511.

Federighi, Craig, et al., "A Distributed Hierarchical Storage Manager for a Video–on–Demand System", ISAT/SPIE, Feb. 1994, pp. 1–13.

Feuquay, Jay, "A Distributed Parallel Storage Architecture and its Potential Application Within EOSDIS", In Proc. 4$^{th}$ NASA GSFC Mass Storage, Mar. 1995.

Flynn, Robert, et al., "Disk Striping and Block Replication Algorithms for Video File Servers", XP–002105211, IEEE Proceedings of Multimedia 1996, pp. 590–597.

Ganger, Gregory R., et al., "Disk Subsystem Load Balancing: Disk Striping vs Conventional Data Placement", IEEE 1993, pp. 40–49.

Ghandeharizadeh, Shahram, et al., "Continuous Retrieval of Multimedia Data Using Parallelism," IEEE Transactions on Knowledge and Data Engineering, vol. 3, No. 4, Aug. 1993, pp. 658–669.

Gibson, Garth A., et al., "A Case for Network–Attached Secure Disks", Carnegie Mellon University, SMU–CS–96–142, Sep. 26, 1996.

Gollapudi, Sreeivas, et al., "Net Media: A Cleint–Server Distributed Multimedia Database Environment," University at Buffalo, Dept. of Computer Science, Technical Report 96–06, Apr. 1996, pp. 1–17.

Haskin, Roger L., et al, "The Tiger Shark File System", Proc. IEEE Computer Conference, Mar. 1996, pp. 226–231.

Haskin, Roger L., "Tiger Shark—A scalable file system for multimedia", in IBM Journal of Research and Development, vol. 42, No. 2, Mar. 1998, pp. 185–197.

Hartman, John H., et al., "The Zebra Striped Network File System," ACM Transactions on Computer vol. 13, No. 3, Aug. 1995, pp. 274–310.

Hsieh, Jenwei, et al., "Performance of a Mass Storage System for Video–on–Demand," Journal of Parallel and Distributed Computing, vol. 30, 1995, pp. 147–167.

Keeton, Kimberly, "The Evaluation of Video Layout Strategies for a High–Performance Storage Server," Computer Science Division, University of California, Berkeley, Nov. 1995, pp. 1–27.

Krishnamurthy, A., et al., "Connection–Oriented Service Renegotiation for Scalable Video Delivery," May 1994, In Proc. of 1$^{st}$ IEEE Intl. Conf. on Multimedia Computer and Systems (ICMCS '94), pp. 502–507.

Ladin, Rivka, et al., Providing High Availability Using Lazy Replication, ACM Transactions on Computer Systems, vol. 10, No. 4, Nov. 1992, pp. 360–391.

Lee, Edward K., et al, "Petal: Distributed Virtual Disks", in The Proceedings of 7$^{th}$ Intl. Conf. on Architectural Support for Programming Languages and Operating Systems, 1996, 9 pages.

Li, Qing, et al., "A Dynamic Data Model for a Video Database Management System," ACM Computing Surveys, vol. 27, No. 4, Dec. 1995, pp. 602–606.

Lin, Ying–Dar, "A Hierarchical Network Storage Architectural for Video–on–Demand Services", atopma; Chiao Tung University, IEEE 1996, pp. 355–364.

Liskov, Barbara, "Replication in the Harp File System," ACM 1991, pp. 226–238.

Little, T.D.C., et al., "Probabilistic Assignment of Movies to Storage Devices in a Video–on–Demand System", In Proc. 4$^{th}$ Intl. Workshop of Network and OS for Digital Audio and Video, Nov. 1992, pp. 213–224.

Liu, Jonathan Chien–Liang, "Performance of a Storage System for Supporting Different Video Types and Qualities," IEEE Journal On Selected Areas In Communications, vol. 14, No. 7, Sep. 1996, pp. 1314–1331.

Menascë, Daniel A., "An Analytic Model of Hierarchical Mass Storage System with Network–Attached Storage Devices", Sigmetrics 1996, ACM, pp. 180–189.

Microsoft NetShow Professional Video Server Data Sheets: "How it Works", "Markets & Applications", "Netshow Pro Specifications", "Overview".

Miller, Ethan L., et al., "RAMA: A File system for Massively Parallel Computers", Proc. 12$^{th}$ IEEE Symp. Mass Storage, 1993, pp. 163–168.

Miller, Ethan L., "Rama: Easy Access to a High–Bandwidth Massively Parallel File System", 1995 USENIX Technical Conf., Jan. 16–20, 1995, pp. 59–70.

Muntz, Richard, et al., "Design of a Fault Tolerant Real–time Storage System for Multimedia Applications", in 1998 Intl. Computer Performance and Dependability Symposium (IPDS'98), Sep. 1998.

Narendran, B., et al., "Data Distribution Algorithms for Load Balanced Fault–Tolerant Web Access", XP–002105212, IEEE 1997, pp. 97–105.

Neufeld, Gerald, "Design of a Variable Bit Rate Continuous Media File Server for an ATM Network," University of British Columbia, Jul. 11, 1995, pp. 1–11.

O'Keefe, Matthew T., "Shared File Systems and Fibre Channel", University of Minnesota, Mar. 1998.

Oomoto, Eitetsu, et al, "OVID: Design and Implementation of a Video–Object Database System", IEEE 1993, pp. 629–643.

Ozden, Banu, "Fault–tolerant Architectures for Continuous Media Servers", Proc. ACM SIGMOD Intl. Conf., Jun. 1996, pp. 79–90.
Popek, Gerald J., et al "Replication in Ficus Distributed File Systems", Proc. Workshop Mgmt. Replicated Data, 1990, pp. 5–10.
Rabin, Michael, "Efficient Dispersal of Information for Security, Load Balancing, and Fault Tolerance," Journal of the Association for Computing Machinery, vol., 36, No. 2, Apr. 1989, pp. 335–448.
The RAIDbook, A Source Book for Disk Array Technology, Fourth Edition, Aug. 8, 1994, pp. ii–45.
Rakow, Thomas C., et al, "The $V^3$ Video Server—Managing Analog and Digital Video Clips", ACM Computing Surveys, 1993, pp. 556–557.
Reddy, A.L. Narasimha, "Disk Scheduling in a Multimedia I/O System", Proc. $1^{st}$ Intl. ACM Conf. on Multimedia, Aug. 1–6, 1993.
Rowe, Lawrence, et al., "A Continuous Media Player", Proc. $3^{rd}$ Int. Workshop on Network and OS Support for Digital Audio and Video, Nov. 1992.
Rowe, Lawrence, et al., "Indexes for User Access to Large Video Databases", ISAT/ISPIE, Feb. 1994, pp. 1–10.
Rowe, Lawrence et al., "MPEG Video in Software: Representation, Transmission, and Playback", ISAT/ISPIE, Feb. 1994, pp. 1–11.
Sandsta, Olay, et al, "Video Server on an ATM Connected Cluster of Workstations", XVII International Conference of the Chilean Computer Science Society, Nov. 1997.
Santos, Jose Renato, et al, "Comparing Random Data Allocation and Data Striping in Multi–media Servers", Sigmetrics 2000, ACM, pp. 44–55.
Santos, Jose Renato, et al, "Design of the RIO (Randomized I/O) Storage Server", UCLA CSD Tech Rp., Jun. 1997.
Satyanarayanan, Mahadev, et al, "Coda: A Highly Available File System For A Distributed Workstation Environment", IEEE, vol. 39, No. 4, Apr. 1990, pp. 447–459.
Shenoy, Prashant J. et al, "Efficient Striping Techniques for Multimedia File Servers", Dept. of Computer Sciences, University of Texas at Austin, TR 96–27, Oct. 1996.
Shenoy, Prashant J. et al, "Issues In Multimedia Server Design", Dept. of Computer Sciences, University of Texas at Austin, ACM Computing Surveys, vol. 27, No. 4, pp. 636–639, Dec. 1995.
Shillner Robert A. et al, "Simplifying Distributed File Systems Using a Shared Logical Disk", Dept. of Computer Science, Princeton University, Tech. Rep. 524–96, (1996).
Siegal, Alex et al, Deceit: A Flexible Distributed File System, (1992), Proc. IEEE, 1990, pp. 15–16.
Software Patent Institute Database of Software Technologies, Interactive Computer/Video Server, Aug. 1991.
Software Patent Institute Database Software Technologies, MMPacking: Load and Storage Balancing Algorithm for Distributed Multimedia Servers, Apr. 1996.
Soltis, Steven R., et al, "The Global File System" Dept. of Electrical Engineering and Laboratory for Computational Science and Engineering, University of Minnesota, Proceedings of the Fifth NASA Goddard Space Flight Center Conference on Mass Storage Systems and Technologies, Sep. 1996, pp. 1–23.
Stephenson, Thomas et al, "Mass Storage Systems for Image Management and Distribution" Twelfth IEEE Symposium on Mass Storage System, IEEE 1993, pp. 233–240.
Teaff, Danny, et al, "The Architecture of the High Performance Storage System (HPSS)", Proc. Goddard Conf. Mass Storage, Mar. 1995.
Tewari, Renu et al, "Design and Performance Tradeoffs in Clustered Video Servers" 1996, IEEE Proceedings of Multimedia '96, 27 pages.
Tewari, Renu et al, "Placement of Multimedia Blocks on Zoned Disks", Proceedings IS&T, SPIE Mult. Comp. Net., Jan. 1996.
Tewari, Renu et al, "Real–Time Issues for Clustered Multimedia Servers", IBM Research Report, RC 20020, Apr. 1995.
Thekkath, Chandramohan, et al, "Frangipani: A Scalable Distribute File System", Proc. $16^{th}$ ACM Symp. Oper. Sys. Princ., Oct. 1997, pp. 224–237.
Tierney, Brian et al, "Distributed Parallel Data Storage Systems: A Scalable Approach to High Speed Image Servers", Proceedings ACM Multimedia, Oct. 1994.
Tierney, Brian et al, "The Image Server System: A High–Speed Parallel Distributed Data Server", Lawrence Berkeley Laboratory Technical Report, LBL–36002, 1994, pp. 1–12.
Tierney, Brian et al, "System Issues in Implementing High Speed Distributed Parallel Storage Systems", Proceedings USENIX High Speed Networking, Aug. 1994.
Tierney, Brian L. et al, Using High Speed Networks to Enable Distributed Parallel Image Server Systems, Proceedings Supercomputing (IEEE), Nov. 1994.
Triantafillou, Peter et al, "Overlay striping and optimal parallel I/O for modern applications", Parallel Computing 24, 1998, 1998, pp. 21–43.
Walker, Bruce, et al, "The LOCUS" Distributed Operating System, University of California at Los Angeles, ACM 1983, pp. 49–70.
Wil, Uffe et al, "Hyperform: A Hypermedia System Development Environment", ACM Transactions on Information Systems, vol. 15, No. 1, Jan. 1997, pp. 1–31.
Wittenburg, T.M. et al, "An Adaptive Document Management System for Shared Multimedia Data", In Proceedings 1994 IEEE Intl. Conf. Multimedia, May 1994.
Wu, Min–You, "Scheduling for Interactive Operations In Parallel Video Servers", University at Buffalo, Department of Computer Science Technical Report 96–23, Dec. 1996.
Wu, Min–You, "Scheduling for Large–Scale Parallel Video Servers", University at Buffalo, Department of Computer Science Technical Report 96–09, May 1996.
Alemany, Juan A., "Data Placement Algorithms for News–On–Demand Servers", A Dissertation submitted . . . University of Washington, Dec. 2, 1997, pp. ii–127.
Chee, Michael A.L. Sam, "Scheduling in the Server of a Distributed Multimedia Information System", A Thesis presented to the University of Waterloo, 1991, pp. 1–222.
Chervenak, Ann Louise, "Tertiary Storage: An Evaluation of New Applications", A Dissertation submitted . . . to University of California at Berkeley, 1994, pp. 1–175.
Dahlin, Michael Donald, "Severless Network File Systems", A Dissertation submitted . . . University of California at Berkeley, 1995, pp. 1–166.
Erickson, Grant M., "The Design and Implementation of the Global File System in Silicon Graphics' Irix", Requirements for the Degree of MS submitted to the University of Minnesota, Mar. 1998, 1–45.

Liu, Chien–Liang (Jonathan), Effective Schemes To Guarantee The Real–Time Retrieval Of Digital Continuous Media, A Thesis submitted to . . . University of Minnesota, Jul. 1996, pp. 1–160.
Miller, Ethan Leo, "Storage Hierarchy Management for Scientific Computing", A Dissertation submitted . . . University of California at Berkeley, 1995, pp. 1–120.
Mitzenmacher, Michael David, "The Power of Two Choices In Randomized Load Balancing", A Dissertation submitted to . . . University of California at Berkeley, Fall 1996, pp. 1–115.
Sandhu, Harjinder Singh, "File Replication and Performance in Large–Scale Distributed Systems", A Thesis submitted . . . University of Toronto, Jan. 1991, 1–117.
Siegal, Alexander, Ph.D., "Performance in flexible distributed file systems", A Dissertation . . . Cornell University, May 1992, pp. 1–163.
Soltis, Steven R., "The Design and Implementation of a Distributed File System based on Shared Network Storage", A Thesis . . . University of Minnesota, Aug. 1997, pp. 1–111.
Tan, Shih–Shan, Ph.D., A distributed file system server for networked multiprocessor workstations, A UMI Dissertation . . . Arizona State University, May 1989.
Mass Storage Systems for Image Management and Distribution, Stephenson et al., IEEE Symposium on Mass Storage Systems, pp. 233–240, 1993.
Hierarchical Storage management in a Distributed VOD System, Brubeck et al., IEEE Multimedia, pp. 37–47, 1996.
A Hierarchical Network Storage Architecture for Video–on–Demand Services, Ying–Dar Lin et al., IEEE Transactions on Computer, pp. 355–364, 1996.
Birk, Y., "Random Raids With Selective Exploitation of Redundancy for High Performance Video Servers", Workshop on Network and Operating System Support for Digital Audio and Video, 1997.
Alemany et al., "Random Striping for News on Demand Servers", University of Washington, Technical Report, pp. 1–15, Feb. 1997.
Tetzlaff, W. et al, "Elements Of Scalable Video Servers", Digest of Papers of the Computer Society Computer Conf. (Spring) COMPCON. Technologies for the Information Superhighway, San Francisco, Mar. 5–9, 1995, Los Alamitos, IEEE Comp. Soc. Press., US., vol. Conf. 40, Mar. 5, 1995, pp. 239–248.
Tewari, R., et al., "High availability in clustered multimedia servers", Data Engineering, 1996, Proc. of the 12th Int. Conf. In New Orleans, LA, USA, Feb. 26–Mar. 1, 1996, Los Alamitos, CA, IEEE Comp. Soc., Feb. 26, 1996, pp. 645–654.
Venkatasubramanian N., et al, "Load management in distributed video servers", Distributed Computing Systems, 1997, Proc. of the 17th Int. Conf. in Baltimore, MD, May 27–30, 1997, Los Alan IEEE Comp. Soc., May 27, 1997, pp. 528–535.

U.S. patent application Ser. No. 10/186,929, Peters et al., filed Jul. 1, 2002.

Modeling of Video–on–Demand Networks with Server Selection, Eric W.M. Wong, et al.,: Global Telecommunications Conference, GLOBECOM 98, The Bridge to Global Integration, IEEE, vol. 1, 8–12, pp. 54–59, Nov. 1998.

* cited by examiner

*Primary Examiner*—Pierre Bataille
(74) *Attorney, Agent, or Firm*—Peter J. Gordon

(57) ABSTRACT

Multiple applications request data from multiple storage units over a computer network. The data is divided into segments and each segment is distributed randomly on one of several storage units, independent of the storage units on which other segments of the media data are stored. Redundancy information corresponding to each segment also is distributed randomly over the storage units. The redundancy information for a segment may be a copy of the segment, such that each segment is stored on at least two storage units. The redundancy information also may be based on two or more segments. This random distribution of segments of data and corresponding redundancy information improves both scalability and reliability. When a storage unit fails, its load is distributed evenly over to remaining storage units and its lost data may be recovered because of the redundancy information. When an application requests a selected segment of data, the request may be processed by the storage unit with the shortest queue of requests. Random fluctuations in the load applied by multiple applications on multiple storage units are balanced nearly equally over all of the storage units. Small data files also may be stored on storage units that combine small files into larger segments of data using a log structured file system. This combination of techniques results in a system which can transfer both multiple, independent high-bandwidth streams of data and small data files in a scalable manner in both directions between multiple applications and multiple storage units.

20 Claims, 23 Drawing Sheets

90A

94A

92A

| | A | B | . |
|---|---|---|---|
| 1 | W | Y | ... |
| 2 | Z | X | ... |
| 3 | X | W | ... |
| 4 | Y | Z | ... |
| . | . | . | |
| . | . | . | |
| . | . | . | |

| | A | R | . |
|---|---|---|---|
| 1 | Y | $R_{1,2}$ | ... |
| 2 | X | $R_{1,2}$ | ... |
| $R_{1,2}$ | Z | {1,2} | ... |
| 3 | X | $R_{3,4}$ | ... |
| 4 | Z | $R_{3,4}$ | ... |
| $R_{3,4}$ | W | {1,2} | ... |
| . | . | . | ... |

FIG. 2B

STORAGE UNIT ID

LIST OF STORAGE UNITS

70

| 1 | BANDWIDTH, MEMORY CAPACITY... | COUNT SINCE LAST PING |
|---|---|---|
| 2 | | |
| 3 | | |
| . | | |
| . | | |
| . | | |
| N | | |

72 74 76

100 SOURCE IDENTIFIER, RANGE 102

| 104 | 106 | 108 |
|---|---|---|
| FILE 1 | A LIST 1 | B LIST 1 |
| FILE 2 | A LIST 2 | B LIST 2 |
| FILE 3 | A LIST 3 | B LIST 3 |

COMPUTER SYSTEM AND PROCESS FOR TRANSFERRING STREAMS OF DATA BETWEEN MULTIPLE STORAGE UNITS AND MULTIPLE APPLICATIONS IN A SCALABLE AND RELIABLE MANNER

CROSS-REFERENCE TO RELATED APPLICATIONS

This application claims the benefit under 35 U.S.C. §120 of, and:

1. is a divisional of U.S. patent application Ser. 09/724,327, filed Nov. 28, 2000, now U.S. Pat. 6,449,688, which is a continuation of U.S. patent application Ser. No. 09/549,841, filed Apr. 14, 2000. now abandoned, which is a continuation of U.S. patent application Ser. No. 09/054,761, filed on Apr. 3, 1998, now U.S. Pat. No. 6,374,336, which is a continuation of U.S. patent application Ser. No. 09/006,070, filed Jan. 12, 1998, now U.S. Pat. No. 6,415,373, which is a continuation of U.S. patent application Ser. No. 08/997,769, filed Dec. 24, 1997, now abandoned;

2. is a continuation of U.S. patent application Ser. No. 09/549,841, filed Apr. 14, 2000, now abandoned, which is a continuation of U.S. patent application Ser. No. 09/054,761, filed on Apr. 3, 1998, now U.S. Pat. No. 6,374,336, which is a continuation of U.S. patent application Ser. No. 09/006,070, filed Jan. 12, 1998, now U.S. Pat. No. 6,415,373, which is a continuation of U.S. patent application Ser. No. 08/997,769, filed Dec. 24, 1997, now abandoned;

3. is a continuation of U.S. patent application Ser. No. 09/054,761, filed on Apr. 3, 1998, now U.S. Pat. No. 6,374,336, which is a continuation of U.S. patent application Ser. 09/006,070, filed Jan. 12, 1998, now U.S. Pat. No. 6,415,373, which is a continuation of U.S. patent application Ser. No. 08/997,769, filed Dec. 24. 1997, now abandoned;

4. is a continuation of U.S. patent application Ser. No. 09/006,070, filed Jan. 12, 1998, now U.S. Pat. No. 6,415,373 which is a continuation of U.S. patent application Ser. No. 08/997,769, filed Dec. 24, 1997, now abandoned; and 5. is a continuation U.S. patent application Ser. No. 08/997,769, filed Dec. 24, 1997, now abandoned.

BACKGROUND

There are several computer system architectures which support distributed use of data over computer networks. These computer system architectures are used in applications such as corporate intranets, Internet sites, distributed database applications and video-on-demand services.

Video-on-demand services, for example, typically are designed with an assumption that a user requests an entire movie, and that the selected movie has a substantial length. The video-on-demand server therefore is designed to support read-only access by several subscribers to the same movie, possibly at different times. Such servers generally divide data into several segments and distribute the segments sequentially over several computers or computer disks. This technique commonly is called striping, and is described, for example, in U.S. Pat. Nos. 5,473,362, 5,583,868 and 5,610,841. One problem with striping data for movies over several disks is that failure of one disk or server can result in the loss of all movies, because every movie has at least one segment written on every disk.

A common technique for providing reliability in data storage is called mirroring. A hybrid system using mirroring and sequential striping is shown in U.S. Pat. No. 5,559,764 (Chen et al.). Mirroring involves maintaining two copies of each storage unit, i.e., having a primary storage and secondary backup storage for all data. Both copies also may be used for load distribution. Using this technique however, a failure of the primary storage causes its entire load to be placed on the secondary backup storage.

Another problem with sequentially striping data over several disks is the increased likelihood of what is called a "convoy effect." A convoy effect occurs because requests for data segments from a file tend to group together at a disk and then cycle from one disk to the next (a "convoy"). As a result, one disk may be particularly burdened with requests at the one time while other disks have a light load. Any new requests to a disk also must wait for the convoy to be processed, thus resulting in increased latency for new requests. To overcome the convoy effect, data may be striped in a random fashion, i.e., segments of a data file is stored in a random order among the disks rather than sequentially. Such a system is described in "Design and Performance Tradeoffs in Clustered Video Servers," by R. Tewari, et. al., in *Proceedings of Multimedia '96*, pp. 144–150. See also, "High Availability in Clustered Multimedia Servers," by R. Tewari, et al., *Proceedings of the IEEE Intern. Conf. On Data Engineering*, February 1996. Such a system still may experience random, extreme loads on one disk, however, due to the generally random nature of data accesses.

None of these systems is individually capable of transferring multiple, independent, high bandwidth streams of data, particularly isochronous media data such as video and associated audio data, between multiple storage units and multiple applications in a scalable and reliable manner. Such data transfer requirements are particularly difficult in systems supporting capture, authoring and playback of multimedia data. In an authoring system in particular, data typically is accessed in small fragments, called clips, of larger data files. These clips tend to be accessed in an arbitrary or random order with respect to how the data is stored, making efficient data transfer difficult to achieve.

It also is common to use one server for high bandwidth data, such as video, and another different server for low bandwidth data, such as text. The problems associated with video or other high bandwidth data typically involve solutions that are considered too complex for other data such as text.

SUMMARY

Data is randomly distributed on multiple storage units connected with multiple applications using a computer network. The data is divided into segments. Each segment is stored on one of the storage units. Redundancy information based on one or more segments also is stored on a different storage unit than the segments on which it is based. The redundancy information may be a copy of each segment or may be computed by an exclusive-or operation performed on two or more segments. The selection of each storage unit on which a segment or redundancy information is stored is random or pseudorandom and may be independent of the storage units on which other segments of the data are stored. Where redundancy information is based on two or more segments, each of the segments is stored on a different storage unit.

This random distribution of segments of data improves both scalability and reliability. For example, because the data is processed by accessing segments, data fragments or clips also are processed as efficiently as all of the data. The applications may request data transfer from a storage unit only when that transfer would be efficient and may request storage units to preprocess read requests. Bandwidth utilization on a computer network may be optimized by scheduling data transfers among the clients and storage units. If one of the storage units fails, its load also is distributed randomly and nearly uniformly over the remaining storage units. Procedures for recovering from failure of a storage unit also may be provided.

The storage units and applications also may operate independently and without central control. For example, each client may use only local information to schedule communication with a storage unit. Storage units and applications therefore may be added to or removed from the system. As a result, the system is expandable during operation.

When the redundancy information is a copy of one segment, system performance may be improved, although at the expense of increased storage. For example, when an application requests a selected segment of data, the request may be processed by the storage unit with the shortest queue of requests so that random fluctuations in the load applied by multiple applications on multiple storage units are balanced statistically and more equally over all of the storage units. Also, an application may send two requests to randomly selected servers. When one request is accepted by one of the selected servers, the other request to the other selected server is canceled. Both of these ways for requesting data enable transactions among multiple clients and multiple servers without using a centralized queue.

This combination of techniques results in a system which can transfer multiple, independent high-bandwidth streams of data between multiple storage units and multiple applications in a scalable and reliable manner.

These techniques also may be used to support all kinds of streams of data, for example, the system maybe used as a file system for supporting database servers and for supporting intranet and Internet applications with small files, such as single images and/or text. In particular, smaller files may be supported by using a log-structured file system that combines small files into larger segments of data for storage on a server. Each server maintains and accesses a log for read/write recovery and archiving operations of small files.

Accordingly, in one aspect, a distributed data storage system includes a plurality of storage units for storing data, wherein segments of data stored on the storage units are randomly distributed among the plurality of storage units. Redundancy information corresponding to each segment also is randomly distributed among the storage units.

When the redundancy information is a copy of one segment, each copy of each segment may be stored on a different one of the storage units. Each copy of each segment may be assigned to one of the plurality of storage units according to a probability distribution defined as a function of relative specifications of the storage units. The distributed data storage system may include a computer-readable medium having computer-readable logic stored thereon and defining a segment table accessible by a computer using an indication of a segment of data to retrieve indications of the storage units from the plurality of storage units on which the copies of the segment are stored. The plurality of storage units may include first, second and third storage units connected to a computer network.

In another aspect, a file system for a computer enables the computer to access remote independent storage units over a computer network in response to a request, from an application executed on the computer, to read data stored on the storage units. Segments of the data and redundancy information are randomly distributed among the plurality of storage units. Where the redundancy information is a copy of a segment, the file system is responsive to the request to read data, to select, for each segment of the selected data, one of the storage units on which the segment is stored. The file system may reconstruct a lost segment from other segments and the redundancy information. Each segment of the requested data is read from the selected storage unit for the segment. The data is provided to the application when the data is received from the selected storage units. In this file system, the storage unit may be selected such that a load of requests on the plurality of storage units is substantially balanced. The storage unit for the segment may be selected according to an estimate of which storage unit for the segment has a shortest estimated time for servicing the request.

More particularly, the file system may request data from one of the storage units, indicating an estimated time. If the first storage unit rejects the request, the file system may request data from another of the storage units, indicating another estimated time. The file system requests the data from the first storage unit when the second storage unit rejects the request. Each storage unit rejects a request for data when the request cannot be serviced by the storage unit within the estimated time. The storage unit accepts a request for data when the request can be serviced by the storage unit within the estimated time.

The file system may read each segment by scheduling the transfer of the data from the selected storage unit such that the storage unit efficiently transfers data. More particularly, the file system may request transfer of the data from the selected storage unit, indicating a waiting time. The data may be requested from another storage unit when the selected storage unit rejects the request to transfer the data, or the file system may request the data from the same storage unit at a later time. Each storage unit rejects a request to transfer data when the data is not available to be transferred from the storage unit within the indicated waiting time. The storage unit transfers the data when the selected storage unit is able to transfer the data within the indicated waiting time.

In another aspect, a file system for a computer enables the computer to access remote independent storage units over a computer network in response to a request, from an application executed on the computer, to store data on the storage units. The file system is responsive to the request to store the data to divide the data into a plurality of segments. Each segment is randomly distributed among the plurality of storage units along with redundancy information based on one or more segments. The file system confirms to the application whether the data is stored.

In this file system, when the redundancy information is a copy of the segment, the random distribution of data may be accomplished by selecting, for each segment, at least two of the storage units at random and independent of the storage units selected for other segments. The selected storage units may be requested to store the data for each segment. The file system may select a subset of the storage units, and may selecting the storage units for storing the segment from among the storage units in the selected subset.

The functionality of the file system also may be provided by another application or through a code library accessible through an application programming interface. Accordingly, another aspect is the client or the process implemented thereby to perform read or write functions, including selection of a storage unit and scheduling of network transfer. Another aspect is the storage units or the process implemented thereby to perform read or write functions, including selection of a storage unit and scheduling of network transfer. Another aspect is a distributed computer system implementing such functionality. These operations may be performed by a client or a storage unit using only local information to enable a system to be readily expandable.

In another aspect, data is recovered in a distributed data storage system having a plurality of storage units for storing the data, wherein segments of the data and redundancy information stored on the storage units are randomly distributed among the plurality of storage units, when failure of one of the storage units is detected. To recover the data, segments of which copies were stored on the failed storage unit are identified. The storage units on which the redundancy information corresponding to the identified segments was stored are identified. The redundancy information is used to reconstruct a copy of the identified segments, which are then randomly distributed among the plurality of storage units. Such data recovery may be used in combination with the read and write functionality of a file system or distributed storage system described herein.

In another aspect, streams of video data are combined to produce composited video data which is stored in a distributed system comprising a plurality of storage units for storing video data, wherein copies of segments of the video data stored on the storage units are randomly distributed among the plurality of storage units. The streams of video data are read from the plurality of storage units. These streams of video data are combined to produce the composited video data. The composited video data is divided into segments. Copies of the segments of the composited video data are randomly distributed among the plurality of storage units. The reading and storage of data may be performed using the techniques described herein.

BRIEF DESCRIPTION OF THE DRAWINGS

In the drawings,

FIG. 2A illustrates a data structure mapping segments of data to storage units 42 in FIG. 1A;

FIG. 2B illustrates a data structure mapping segments of data storage units 42 in FIG. 1B;

DETAILED DESCRIPTION

Figure 1A:
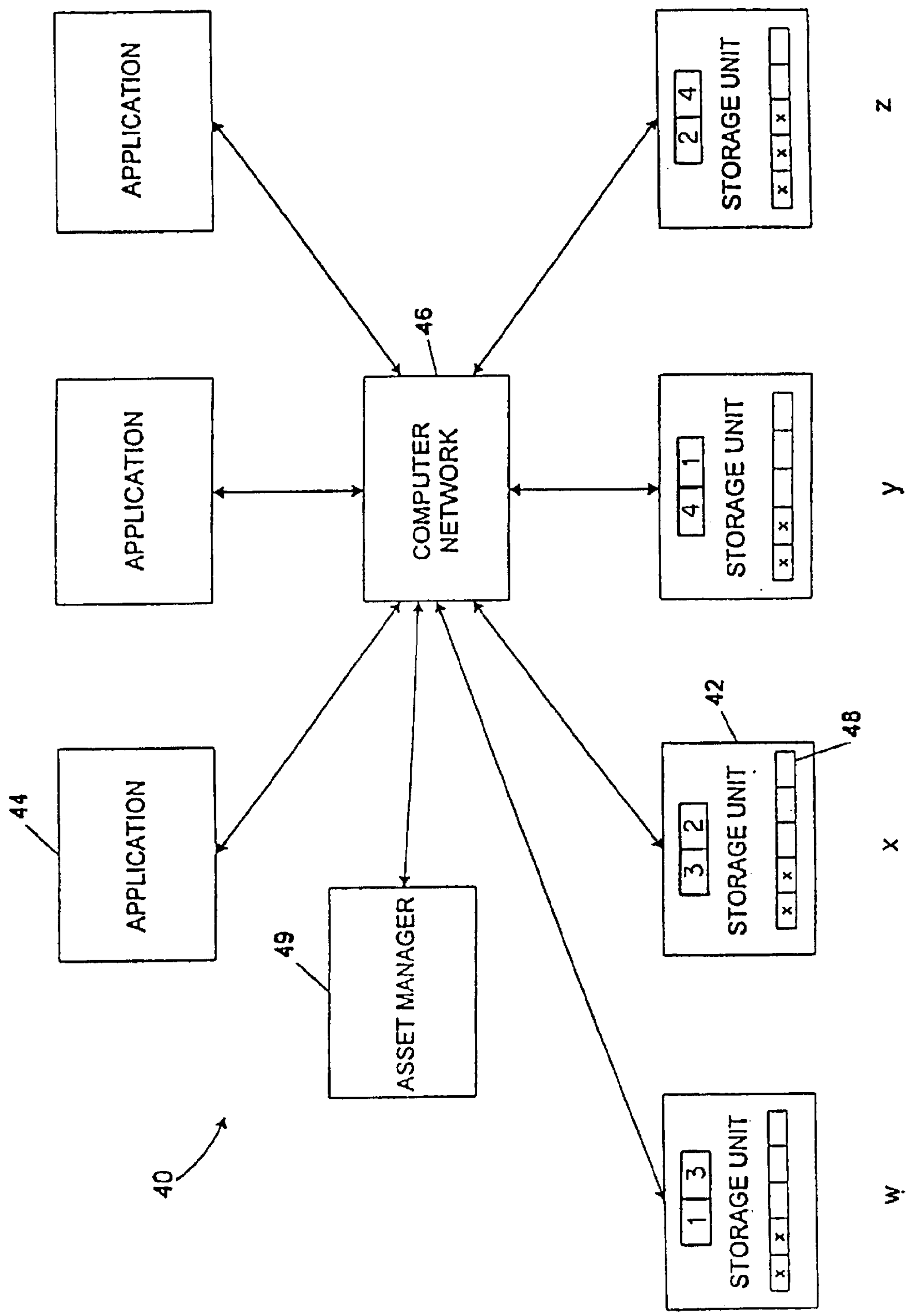
FIG. 1A is a block diagram of an example computer system.

In the following detailed description, which should be read in conjunction with the attached drawings, example embodiments of the invention are set forth. All references cited herein are hereby expressly incorporated by reference.

Several problems arise in the design of a scalable and reliable distributed system which supports transfer of data, particularly multiple, independent streams of high-bandwidth, time-sensitive data such as motion video and associated audio and other temporally continuous media, between multiple applications and multiple storage units. Some of these problems also arise for file systems supporting database servers and intranet or other computer network, including Internet, applications that typically use many small files. In such a system, an application, for example which is used to author a motion video program, may access randomly several small portions of several different files which may be distributed over several storage units. Several applications may require immediate and simultaneous access to the same data, and any application should be able to access any piece of media at any time. In a system which is used for broadcasting or other time sensitive playback, fault tolerance also is desirable. Finally, the system should be both expandable and scalable in a manner which simplifies the addition of new storage units and new applications even while the system is in operation. Other desirable characteristics of such a system include a long mean time to failure, no single point of failure, the capability of being repaired rapidly and while operating, tolerance to storage unit failure without disrupting operation, and the capability of recovering lost data.

In one embodiment, the system includes multiple applications connected by a computer network to multiple separate and independent storage units for storing data. The data is divided into segments. Redundancy information for each segment is determined and the segment and its redundancy information are stored on a different one of the storage units. The selection of a storage unit for a segment is random or pseudorandom and may be independent of the storage units selected for other segments, such as the immediately preceding segment. The redundancy information and random distribution of data both increases the ability of the system to efficiently transfer data in both directions between applications and storage and improves fault tolerance.

The redundancy information may be a copy of a segment. This replication of segments allows the system to further control which storage unit is accessed by a particular application, such as by selecting the storage unit with the shortest queue of requests. As a result, random fluctuations in load are distributed approximately evenly over all of the storage units.

Applications also may request data transfer with a storage unit only when the transfer would be efficient. By scheduling communication over the network appropriately, network congestion also may be reduced and network bandwidth may be used more efficiently. Central control points may be eliminated by having each client use local information to schedule communication with a storage unit.

FIG. 1A illustrates an example computer system 40. The computer system includes a plurality of storage units 42. A storage unit is a device with a nonvolatile computer-readable medium, such as a disk, on which data may be stored. The storage unit also has faster, typically volatile, memory into which data is read from the medium. Each storage unit also has its own independent controller which responds to requests for access, including but not limited to read and write access, to data stored on the medium. For example, the storage unit 42 may be a server computer which stores data in a data file in the file system of the server. There may be an arbitrary number of storage units in the computer system 40.

Applications 44 are systems that request access to the storage units 42 via requests to the storage units over a computer network 46. The storage units 42 may deliver data to or receive data from the applications 44 over the computer network 46. Applications 44 may include systems which capture data received from a digital or analog source for storing the data on the storage units 42. Applications 44 also may include systems which read data from the storage units, such as systems for authoring, processing or playback of multimedia programs. Other applications 44 may perform a variety of fault recovery tasks. Applications also may be called "clients." One or more catalog managers 49 also may be used. A catalog manager is a database, accessible by the applications 44, that maintains information about the data available on the storage units 42. This embodiment may be used to implement a broadcast news system such as shown in PCT Publication WO97/39411, dated Oct. 23, 1997.

Data to be stored on the storage units 42 is divided into segments. Redundancy information is created based on one or more segments. For example, each segment may be copied. As a result, each segment is stored on at least two of the storage units 42.

Alternatively, the redundancy information may be created by the exclusive-or of two or more segments. Each segment is stored on a different one of the storage units 42 from its redundancy information. The selection of the storage units on which a segment and its redundancy information are stored is random or pseudorandom and may be independent of the storage units on which other segments of the data are stored. Pseudorandom sequences that are poor, i.e., that fail most tests of randomness, may be used. Quasi-random or other deterministic sequences also maybe used. Any sequence that provides a non-sequential distribution may be used where the pattern of distribution is different from one file to the next and from the file to its redundancy information.

In one embodiment, two consecutive segments are not stored on the same storage unit. The probability distribution for selecting a storage unit for storing a segment and its redundancy information may be uniform over all of the storage units where the specifications, such as capacity, bandwidth and latency, of the storage units are similar. This probability distribution also may be a function of the specifications of each storage unit. The number of copies stored may vary from file to file, and from segment to segment within a file. For example, the number of copies of a segment may vary according to the kind of information in the segment or according to information about locality of access of data in file. For example, header information of a file may be copied more than other parts of the file. The random distribution of segments of data and corresponding redundancy information improves both scalability and reliability.

An example of the random distribution of copies of segments of data is shown in FIG. 1A. In FIG. 1A, four storage units 42, labeled w, x, y and z, store data which is divided into four segments labeled 1, 2, 3 and 4. An example random distribution of the segments and their copies is shown, where: segments 1 and 3 are stored on storage unit w; segments 3 and are stored on storage unit x; segments 4 and 1 are stored on storage unit y; and segments 2 and 4 are stored on storage unit z.

Figure 1B:
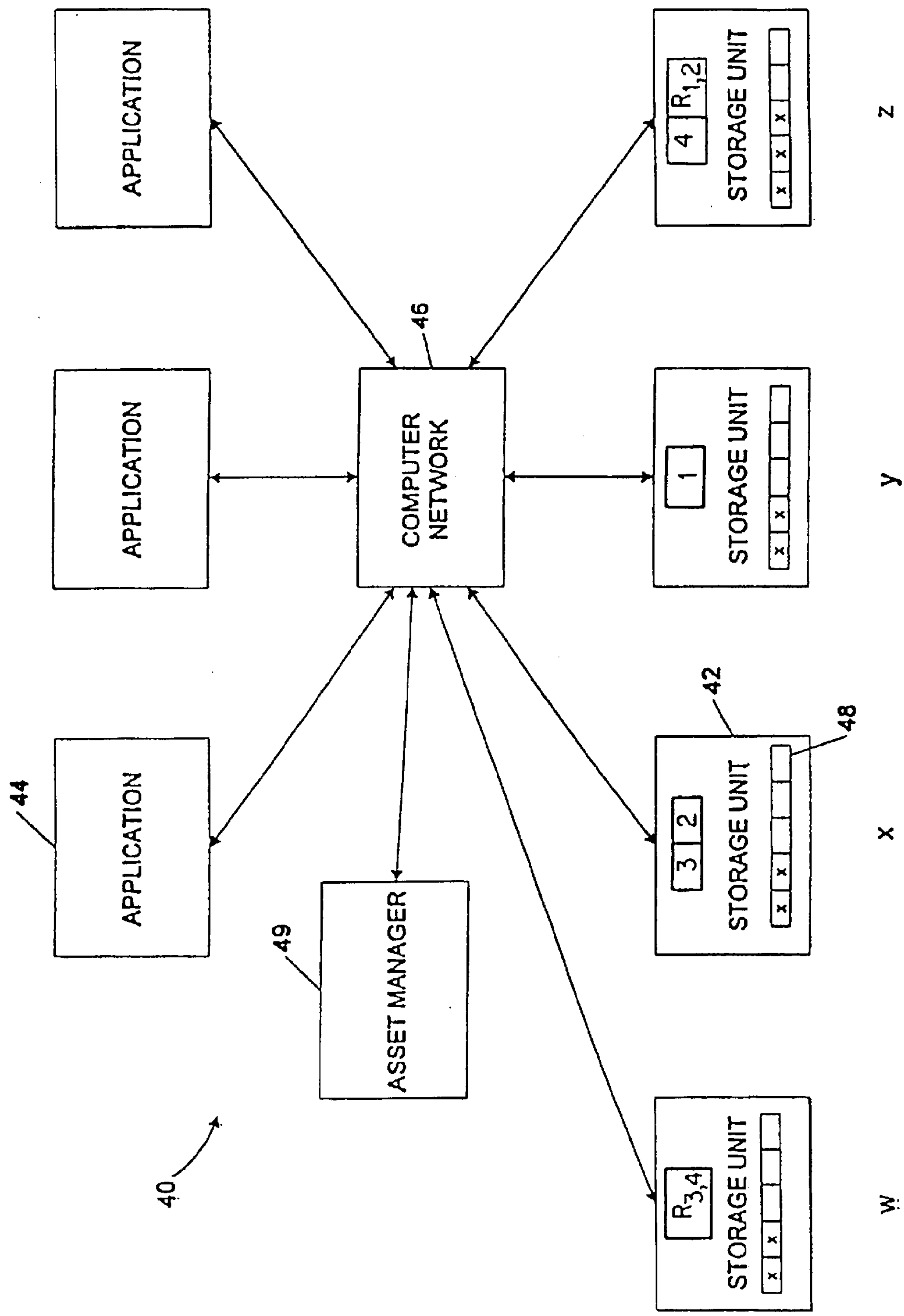
FIG. 1B is a block diagram of another embodiment of the system of FIG. 1A.

FIG. 1B illustrates an embodiment where a segment and its corresponding redundancy information are randomly distributed among the storage units. In FIG. 1B, four storage units 42, labeled w, x, y and z, store data which is divided into four segments labeled 1, 2, 3 and 4. The redundancy information for a segment may be based on one or more segments. In this example, two segments are used in what is called herein a "redundancy set." The exclusive-or of the segments i,j in the redundancy set is computed, thus providing redundancy information $R_{i,j}$. The exclusive-or of the redundancy information $R_{i,j}$ and segment i produces segment j. Similarly, the exclusive-or of redundancy information $R_{i,j}$ and segment j produces segment i. Each segment in a redundancy set and the redundancy information are stored on different storage units. This approach for redundancy reduces storage requirements and is used primarily for archived data. An example random distribution of segments and the redundancy information is shown in FIG. 1B, where: redundancy information $R_{3,4}$ for segments 3 and 4 is stored on storage unit w; segments 2 and 3 are stored on storage unit x; segment 1 is stored on storage unit y; and segment 4 and redundancy information $R_{1,2}$ are stored on storage unit z. The redundancy information also may be created using many other techniques known in the art of fault tolerance.

When the redundancy information is a copy of a segment, the random distribution of segments may be represented in and tracked by a segment table 90, or catalog, such as shown in FIG. 2A. In particular, for data captured from a given source or for data from a given file, each segment, represented by a row 92A, has two copies, called A and B, which are represented by columns 94A. The columns 94A in the segment table 90A may be referred herein to as the "A list" or "B list," respectively. Each list alternatively may be represented by a seed number for a pseudorandom number generator that is used to generate the list, or by a list or other suitable data structure such as a record, linked list, array, tree, table, etc. When using a pseudorandom number generator, care should be taken to ensure that the storage units indicated by the numbers for any given segment in the A and B lists are not the same. The contents of columns 94A indicate the storage unit on which a copy of a segment is stored.

The random distribution of segments and redundancy information based on two or more segments may be represented in and tracked by a segment table 90B, or a catalog, such as shown in FIG. 2B. In particular, for data captured from a given source or for data from a given file, each segment, represented by a row 92B, has a copy called A, represented in column 94B. Column 96B may be used to indicate where the corresponding redundancy information is stored. There are several ways to indicate where the redundancy information is stored. If the redundancy segments are identified as such in the table, then the order of the segments in the table may be used to infer which segments correspond to a given redundancy segment. In this case column 96B may be omitted. For example, the redundancy information may be treated as another segment, having its own row 92B in the segment table 90B. Alternatively, the column 96B may indicate the last segment in the redundancy set in which the segment is contained. In this embodiment, row 92B of the last segment of a redundancy set indicates a storage unit on which the redundancy information for that redundancy set is stored. In the implementation shown in FIG. 2B, column 96B indicates the segments within the redundancy set for the redundancy information.

Each segment table, or file map, may be stored separately from other segment tables. Segment tables may be stored together, as a catalog. Catalogs may be stored on a catalog manager 49, at individual clients, at a central database, or may be distributed among several databases or clients. Separate catalogs could be maintained, for example, for different types of media programs. For example, a broadcast news organization may have separate catalogs for sports news, weather, headline news, etc. The catalogs also may be stored on the storage units in the same manner as other data. For example, each client may use a seed for a random number generator to access the catalog. Such catalogs may be identified by other clients to access data or to handle recovery requests, for example, by sending a network broadcast message to all catalog managers or clients to obtain a copy of the catalog or of an individual segment table.

In order to access the segments of data, each segment should have a unique identifier. The copies of the segments may have the same unique identifier. Redundancy information based on two or more segments has its own identifier. The unique identifier for a segment is a combination of a unique identifier for the source, such as a file, and a segment number. The unique identifier for the source or file may be determined, for example, by a system time or other unique identifier determined when data is captured from the source or at the time of creation of the file. A file system, as described below, may access the catalog manager to obtain the segment table for each source or file which lists the segment identifiers and the storage units on which the segments and redundancy information are stored. Each storage unit also may have a separate file system which contains a directory of the segment identifiers and the location on that storage unit where they are stored. Application programs executed by a client may use the identifiers of a source or file, and possibly a range of bytes within the source or file to request data from the file system of the client. The file system of the client then may locate the segment table for the source or file, determine which segments need to be accessed and select a storage unit from which the data should be read for each segment, using the unique segment identifiers.

Referring again to FIGS. 1A and 1B, when an application 44 requests access to a selected segment of data on one of the storage units 42, the storage unit places the request on a queue 48 that is maintained for the storage unit. Applications may make such requests independently of each other or any centralized control, which makes the system more readily scalable. Where the redundancy information is a copy of a segment, the selection of a storage unit to which a request is sent may be controlled such that random fluctuations in the load applied by multiple applications 44 on multiple storage units 42 are balanced statistically and more equally over all of the storage units 42. For example, each request from an application may be processed by the storage unit that has the shortest queue of requests. With any kind of redundancy information, the transfer of data between applications and storage units may be scheduled to reduce network congestion. The requests for data may be performed in two steps: a pre-read request which transfers the data from disk to a buffer on the storage unit, and a network transfer request which transfers data over the network from the buffer to the application. To process these two different requests, the queue 48 may include a disk queue and a network queue.

This combination of randomly distributed segments of data and corresponding redundancy information and the scheduling of data transfer over the network provides a system which can transfer multiple, independent high-bandwidth streams of data in both directions between multiple storage units and multiple applications in a scalable and reliable manner. Using copies of segments as redundancy information, the selection of a storage unit for read access may be based on the relative loads of the storage units, and performance may be improved.

Figure 3:
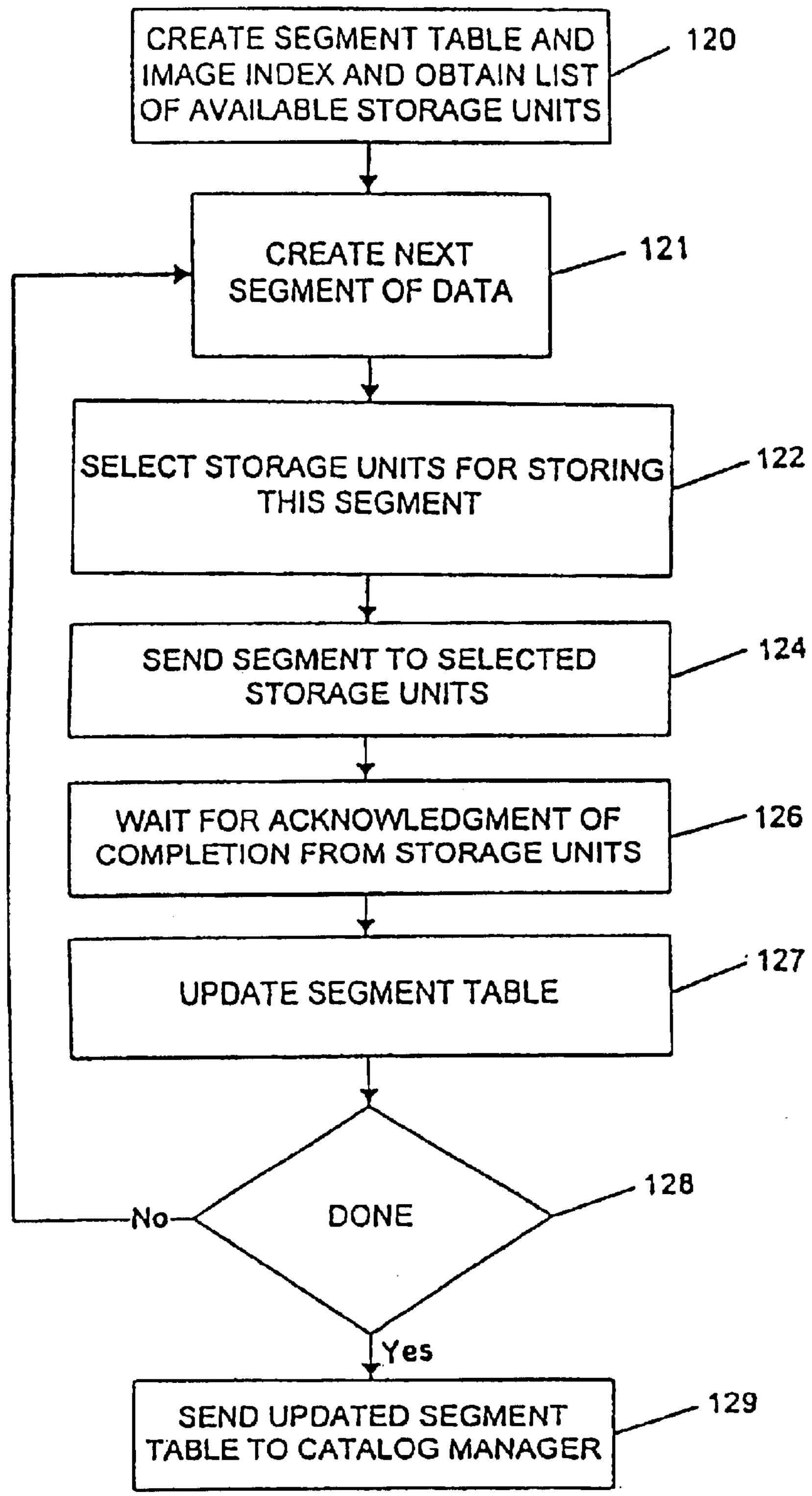
FIG. 3 is a flowchart describing how data may be captured and distributed among several storage units in one embodiment.

Referring now to FIG. 3, an example process for storing multiple copies of segments of data in a randomly distributed manner over the several storage units will now be described in more detail. An example process using redundancy information based on two or more segments is described below in connection with FIG. 24. The following description is based on the real-time capture of motion video data. The example may be generalized to other forms of data, including, but not limited to other temporally continuous media, such as audio, or discrete media such as still images or text, or even other data such as sensory data.

It is generally well-known how to capture real-time motion video information into a computer data file, such as described in U.S. Pat. Nos. 5,640,601 and 5,577,190. This procedure may be modified to include steps for dividing the captured data into segments, and copying and randomly distributing the copies of the segments among the storage units. First, in step 120, the capturing system creates a segment table 90A (FIG. 2A). An image index, that maps each image to an offset into the stream of data to be captured, also typically is created. The indexed images may correspond to, for example, fields or frames. The index may refer to other sample boundaries, such as a period of time, for other kinds of data, such as audio. The capturing system also obtains a list of available storage units. One way to identify which storage units are available is described in more detail below in connection with FIGS. 10–12.

A segment of the data is created by the capturing system in step 121. The size of the segment may be, for example, one quarter, one half or one megabyte for motion video information. Audio information may be divided into, for example, segments having a size such as one-quarter megabyte. In order to provide alignment, if possible, of the segment size to divisions of storage and transmission, the size of the segment may be related, i.e., an integer multiple of, to an uncompressed or fixed data rate, disk block and track size, memory buffer size, and network packet (e.g., 64K) and/or cell sizes (e.g., 53 bytes for ATM). If the data is uncompressed or is compressed using fixed-rate compression, the segment may be divided at temporal sample boundaries which provides alignment between the image index and the segment table. Generally speaking, the segment size should be driven to be larger in order to reduce system overhead, which is increased by smaller segments. On the other hand, there is an increased probability that a convoy effect could occur if the amount of data to be stored and segment size are such that the data is not distributed over all of the storage units. Additionally, there is an increased latency to complete both disk requests and network requests when the segment sizes are larger.

Next, at least two of the storage units 42 are selected, in step 122, by the capturing system from the list of storage units available for storing the selected segment. Selection of the storage units for the copies of one segment is random or pseudorandom. This selection may be independent of the selection made for a previous or subsequent segment. The set of storage units from which the selection is made also may be a subset of all of the available storage units. The selection of a set of storage units may be random or pseudorandom for each source or file. The size of this subset should be such that each storage unit has at least two different segments of the data in order to minimize the likelihood of occurrence of a convoy effect. More particularly, the data should be at least twice as long (in segments) as the number of storage units in the set. The size of the subset also should be limited to reduce the probability that two or more storage units in the subset fail, i.e., a double fault may occur, at any given time. For example, the probability that two storage units out of five could fail is less than the probability that two storage units out of one hundred could fail, so the number of storage units over which data is distributed should be limited. However, there is a trade off between performance and subset size. For example, using randomly selected subsets of ten out of one-hundred storage units, when two of the one-hundred storage units fail, then ten percent of the files are adversely affected. Without subsets, one hundred percent of the files typically would be adversely affected.

In the rare likelihood of a double fault, i.e., where two or more storage units fail, a segment of data may be lost. In a standard video stream, the loss of a segment might result in a loss of one or two frames in a minute of program material. The frequency of such a fault for a given source or file is a function of its bandwidth and the number of storage units. In particular, where:

s=size of lost data in megabytes (MB), n=initial number of storage units, b=average bandwidth of storage units in MB per second, MTBF=mean time between failures, MTTR=mean time to repair or replace, MTDF=mean time for a double fault failure, and SMTBF=total system mean time between failures, $$SMTBF = \frac{MTBF}{n}, \text{ and } MTDF = \frac{1}{MTTR} * \frac{MTBF}{n} * \frac{MTBF}{(n-1)}.$$

As an example, in a system with 100 storage units, each with a capacity of 50 gigabytes, where MTTR is one hour and MTBF is 1000 hours or six weeks, there likely will be 115 years to double fault failure. If the MTTR is increased to twenty-four hours, then there likely will be 4.8 years to double fault failure.

Referring again to FIG. 3, after two storage units are selected, the current segment then is sent to each of the selected storage units in step 124 for storage. These write requests may be asynchronous rather than sequential. The capture system then may wait for all storage units to acknowledge completion of the storage of the segment in the step 126. When data is stored in real time while being captured, the data transfer in step 124 may occur in two steps, similar to read operations discussed in more detail below. In particular, the client first may request a storage unit to prepare a free buffer for storing the data. The storage unit may reply with an estimated time for availability of the buffer. When that estimated time is reached, the capture system may request the storage unit to receive the data. The storage unit then may receive the data in its buffer, then transfer the data in its buffer to its storage medium and send an acknowledgment to the capture system.

If a time out occurs before an acknowledgment is received by the capturing system, the segment may be sent again either to the same storage unit or to a different storage unit. Other errors also may be handled by the capturing system. The operations which ensure successful storage of the data on the selected units may be performed by a separate thread for each copy of the segment.

After the data is successfully stored on the storage units, the segment table 90 is updated by the capturing system in step 127. If capture is complete, as determined in step 128, then the process terminates; otherwise, the process is repeated for the next segment by returning to step 121. The segment table may be maintained, e.g., in main memory, at the capture system as part of the file system. While the capturing system manages the segment table and selection of storage units in this example, other parts of the system could coordinate these activities as well, such as the catalog manager 49. The updated segment table may be sent to, for example, the catalog manager in step 129. Alternatively, the catalog manager may produce the segment table by using accumulated knowledge of system operation, and may send this table to the capture system on request.

Figure 4:
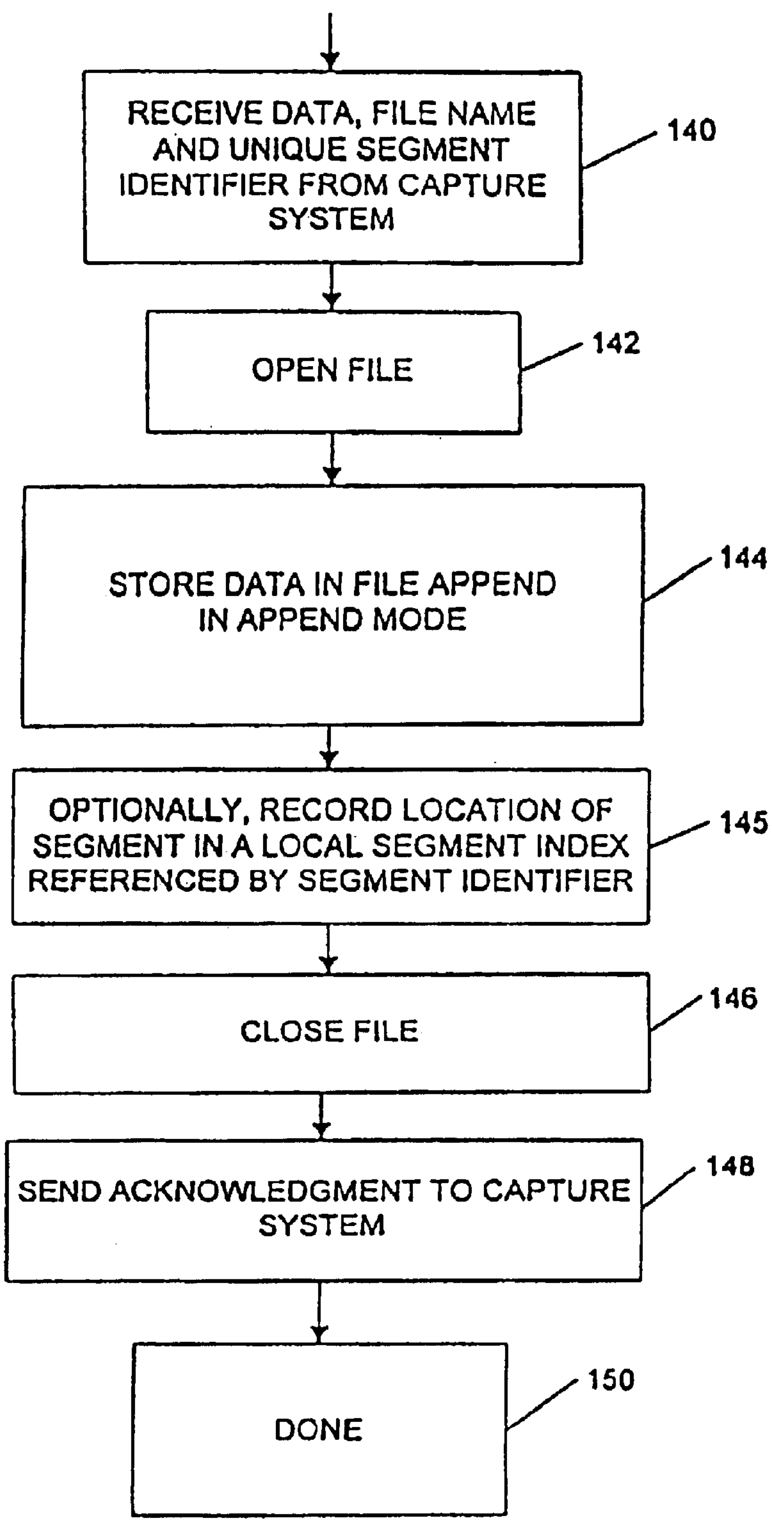
FIG. 4 is a flowchart describing how storage units may process requests for storing data in one embodiment.

FIG. 4 is a flowchart describing in more detail how a storage unit stores a segment of the captured data or redundancy information. The storage unit receives the segment of data from a capturing system in step 140 and stores the data in a buffer at the storage unit. Assuming the storage unit uses data files for storage, the storage unit opens a data file in step 142 and stores the data in the data file in step 144. The catalog manager may specify the location where the segment should be stored. The data may be appended to an existing data file or may be stored in a separate data file. As discussed above, the storage unit or the catalog manager may keep track of segments by using a unique identifier for each segment and by storing a table mapping the segment identifier to its location on the storage unit, in step 145. This table may implement the data file abstraction on the storage unit. When the storage unit actually writes data to its main storage may depend on other read and write requests pending for other applications. The management of these concurrent requests is addressed in more detail below. The file then may be closed in step 146. An acknowledgment may be sent to the capturing system in step 148.

When the process of FIGS. 3 and 4 is complete, the captured data is randomly distributed, with at least two copies for each segment, over several storage units. Multiple applications may request access to this data. The manner in which this access occurs is likely to be random. Accordingly, it should be apparent that any storage unit may receive multiple requests for both reading data from and writing data to files stored on the storage unit from multiple applications. In order to manage the requests, a queue 48 of requests is maintained by each of the storage units 42, as mentioned above. In the following description of an example embodiment, a storage unit maintains two queues: one for requests for disk access, and another for requests for network transfers. One embodiment of these disk and network queues is described in more detail below in connection with FIG. 19.

When data is requested by an application program executed on a client 44, a storage unit is selected to satisfy the request when each segment of data is stored on at least two storage units. The segment table 90 for the requested data is used for this purpose. The selection of a storage unit may be performed by the application program requesting the data, by a file system of the client executing the application program, through coordination among storage units or by another application such as a catalog manager. The selection may be random or pseudorandom, or based on a least recently used algorithm, or based on the relative lengths of the queues of the storage units. By selecting a storage unit based on the relative lengths of the queues on the available storage units, the load of the multiple applications may be distributed more equally over the set of storage units. Such selection will be described in more detail below in connection with FIGS. 16–18.

Small files may not be suitable for division into multiple segments for distribution over multiple storage units. Nonetheless, small files or small records may be stored within a storage unit. Each storage unit may combine its small files and records into larger segments for storage within the storage unit by using a log structured file system, such as described in "Serverless Network File Systems," Ph.D. Thesis, Dept. of Computer Science, Univ. of California, Berkley, by Michael Donald Dahlin, 1995, and "The Zebra Striped Network File System," by John H. Hartman et al., in *ACM Transactions on Computer Systems*, Vol. 13, No. 3, August 1995, pp. 274–310. A management of such files is simplified by limiting the log structured files to data stored within each storage unit.

To support use of a log structured file system in combination with the other aspects of the system described herein, a client indicates when storing data whether the data is to be stored as a "streaming file," such as for video and audio data, that is segmented and distributed over several storage units or as a "journalled" file to be stored using a log structured file system within a storage unit. The size of the larger segments for the log structured file system may be the same or similar to the size of the segments of the streaming media files. The distinction between the streaming files and journalled files for each access may be made by default, may be specified by a client, may be determined by detecting a file size, or by sending or receiving message between the client and storage unit, or the determination may be made by the storage unit. Each storage unit maintains a log that is accessed for read, write, recovery and archiving functions on small files or records, and that tracks how two or more small files or records are combined into a larger segment. By performing all management of the log structured files on each storage unit, and eliminating knowledge of this structure from operations performed by the client, the benefits of a log structured file system may be provided without the inherent difficulties in maintaining cache coherencies and other problems involved with centralized control of the logs of the files. The logs or journals used in the log structured file system also may be used to enable rollback operations if stored over time. Such a log structured file system may be combined with a streaming file system where no redundancy information is stored for either journalled or streaming files.

The functionality provided through the log structured file system also enables a portion of a segment of a file to be read, modified, and/or written by a client operation. Operations used to support reading a small file from a log structured file may be applied to reading a portion of a segment of a streaming data file. If a storage unit has sufficient processing capability, instructions may be sent by a client to a storage unit to read, modify and write a portion of a segment.

More details of a particular embodiment will now be described. For this purpose, the storage unit 42 may be implemented as a server or as an independently controlled disk storage unit, whereas the applications 44 are called clients. Clients may execute application programs that perform various tasks. A suitable computer system to implement either the servers or clients typically includes a main unit that generally includes a processor connected to a memory system via an interconnection mechanism, such as a bus or switch. Both the server and client also have a network interface to connect them to a computer network. The network interface may be redundant to support fault tolerance. The client also may have an output device, such as a display, and an input device, such as a keyboard. Both the input device and the output device may be connected to the processor and memory system via the interconnection mechanism.

It should be understood that one or more output devices may be connected to the client system. Example output devices include a cathode ray tube (CRT) display, liquid crystal displays (LCD), printers, communication devices such as a modem or network interface, and video and audio output. It should also be understood that one or more input devices may be connected to the client system. Example input devices include a keyboard, keypad, trackball, mouse, pen and tablet, communication devices such as a modem or network interface, video and audio digitizers and scanner. It should be understood the invention is not limited to the particular input or output devices used in combination with the computer system or to those described herein.

The computer system may be a general purpose computer system which is programmable using a high level computer programming language, such as the "C" and "C++" programming languages. The computer system also may be specially programmed, special purpose hardware. In a general purpose computer system, the processor is typically a commercially available processor, of which the series x86 processors such as the Pentium II processor with MMX technology, available from Intel and similar devices available from AMD and Cyrix, the 680X0 series microprocessors available from Motorola, the Alpha series microprocessor available from Digital Equipment Corporation, and the PowerPC processors available from IBM are examples. Many other processors are available. Such a microprocessor may execute a program called an operating system, of which the WindowsNT, Windows 95, UNIX, IRIX, Solaris, DOS, VMS, VxWorks, OS/Warp, Mac 0S System 7 and OS8 operating systems are examples. The operating system controls the execution of other computer programs and provides scheduling, debugging, input/output control, compilation, storage assignment, data management and memory management, and communication control and related services. The processor and operating system define a computer platform for which application programs in high-level programming languages are written.

Each server may be implemented using an inexpensive computer with a substantial amount of main memory, e.g., much more than thirty-two megabytes, and disk capacity, e.g., several gigabytes. The disk may be one or more simple disks or redundant arrays of independent disks (RAID) or a combination thereof. For example, the server may be a Pentium or 486 microprocessor-based system, with an operating system such as WindowsNT or a real-time operating system such as Vx Works. The authoring system, capturing system and playback system may be implemented using platforms that currently are used in the art for those kinds of products. For example, the MEDIACOMPOSER authoring system from Avid Technology, Inc., of Tewksbury, Mass., uses a Power Macintosh computer from Apple Computer, Inc., that has a PowerPC microprocessor and a MacOS System 7 operating system. A system based on a Pentium II processor with MMX technology from Intel, with the WindowsNT operating system, also may be used. Example playback systems include the "SPACE" system from Pluto Technologies International Inc., of Boulder, Colo., or the AIRPLAY system from Avid Technology which uses a Macintosh platform. The catalog manager may be implemented using any platform that supports a suitable database system such as the Informix database. Similarly, an asset manager that tracks the kinds of data available in the system may be implemented using such a database.

The memory system in the computer typically includes a computer readable and writeable nonvolatile recording medium, of which a magnetic disk, optical disk, a flash memory and tape are examples. The disk may be removable, such as a floppy disk or CD-ROM, or fixed, such as a hard drive. A disk has a number of tracks in which signals are stored, typically in binary form, i.e., a form interpreted as a sequence of ones and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network.

As stated above, each storage unit 42, if accessed through server, and each application may have a file system, typically part of the operating system, which maintains files of data. A file is a named logical construct which is defined and implemented by the file system to map the name and a sequence of logical records of data to locations on physical storage media. While the file system masks the physical locations of data from the application program, a file system generally attempts to store data of one file in contiguous blocks on the physical storage media. A file may specifically support various record types or may leave them undefined to be interpreted or controlled by application programs. A file is referred to by its name or other identifier by application programs and is accessed through the file system using commands defined by the operating system. An operating system provides basic file operations for creating a file, opening a file, writing a file, reading a file and closing a file. These operations may be synchronous or asynchronous, depending on the file system.

As described herein, data of a file or source is stored in segments, of which copies or other form of redundancy information are randomly distributed among multiple storage units.

Generally speaking for most file systems, in order to create a file, the operating system first identifies space in the storage which is controlled by the file system. An entry for the new file is then made in a catalog which includes entries indicating the names of the available files and their locations in the file system. Creation of a file may include allocating certain available space to the file. In one embodiment, a segment table for the file may be created. Opening a file typically returns a handle to the application program which it uses to access the file. Closing a file invalidates the handle. The file system may use the handle to identify the segment table for a file.

In order to write data to a file, an application program issues a command to the operating system which specifies both an indicator of the file, such as a file name, handle or other descriptor, and the information to be written to the file. Generally speaking, given the indicator of the file, an operating system searches the directory to find the location of the file. The data may be written to a known location within the file or at the end of the file. The directory entry may store a pointer, called a write pointer, to the current end of the file. Using this pointer, the physical location of the next available block of storage may be computed and the information may be written to that block. The write pointer may be updated in the directory to indicate the new end of the file. In one embodiment, the write operation randomly distributes copies of segments of the file among the storage units and updates the segment table for the file. The write operation also may cause a segment and corresponding redundancy information to be stored on different storage units.

In order to read data from a file, an application program issues a command to the operating system specifying the indicator of the file and memory locations assigned to the application where the read data should be placed. Generally speaking, an operating system searches its directory for the associated entry given the indicator of the file. The application program may specify some offset from the beginning of the file to be used, or, in a sequential file system, the directory may provide a pointer to a next block of data to be read. In one embodiment, the selection of a storage unit and the scheduling of data transfer is implemented as part of the read operation of the file system of the client.

The client may use a file system or a special code library with a defined application programming interface (API) to translate requests for portions of a file into requests for segments of data from selected storage units. The storage unit may have its own file system which may be entirely separate from the client file system. All of the segments on a storage unit may be stored, for example, in a single file at the storage unit. Alternatively, the client file system may use the storage units over the network as raw storage, using the catalog manager and segment tables to implement the file abstraction. The segment table for a file also may indicate the locations of each segment on the storage units selected for the segment.

A primary advantage of using a file system is that, for an application program, the file is a logical construct which can be created, opened, written to, read from and closed without any concern for the physical storage medium or location on that medium used by the operating system to store the data. In a network file system, the file system manages requests for data from a specified file from the various storage units, without requiring an application program to know any details about the physical storage where the data is stored or the computer network. If the storage unit has its own independent file system, the client file system also need not know details of the storage mechanism of the storage units. The storage units may use, for example, the file system associated with their own operating system, such as the WindowsNT file system or the file system of a real time operating system such as VxWorks, or a file system that allows asynchronous operations.

The storage units are interconnected with the clients and, optionally, the catalog manager using a computer network. A computer network is a set of communications channels interconnecting a set of computer devices or nodes that can communicate with each other. The nodes may be computers such as the clients, storage units and catalog managers, or communication devices of various kinds, such as switches, routers, gateways and other network devices. The communication channels may use a variety of transmission media including optical fibers, coaxial cable, twisted copper pairs, satellite links, digital microwave radio, etc.

A computer network has a topology which is the geometrical arrangement of the connection of the nodes by the network. Kinds of topologies include point-to-point connection, linear bus, ring connection, star connection, and multiconnected networks. A network may use various combinations of these basic topologies. The topology may vary depending on the physical installation. A non-blocking, switch-based network in which each node, i.e., client or storage unit, is connected directly to the same switch may be used. In some implementations, multiple clients and storage units may be connected on a physical loop or subnetwork which are interconnected into a switching fabric. The system also may be connected using multiple switches.

The network also has a network architecture which defines the protocols, message formats, and other standards to which communication hardware and software conform in order for communication to occur between devices on the network. A commonly-used network architecture is the International Standards Organization seven-layer model known as the Open Systems Interconnection reference model. The seven layers are the application, presentation, session, transport, network, link and physical layers. Each machine communicates with any other machine using the same communication protocol at one of these layers.

In one embodiment, the link layer preferably is one that retains the order of packets as they are received at the client in order to avoid the potential for an unlimited latency. Accordingly, suitable link layer protocols include asynchronous transfer mode (ATM) networks, such as OC3, OC12, or higher bandwidth networks. An ATM system operating in the AAL5 mode is preferable. Ethernet networks with 100 Tx to gigabit (1,000 Tx) capacity also may provide efficient packet transmission from the source to the destination. Suitable Ethernet network platforms are available, for example, from 3 Com of Santa Clara, Calif. An example ATM system is available from Fore Systems of Warrendale, Pa. or Giga-Net, of Concord, Mass. A FibreChannel, FDDI or HIPPI network also may be used. The different clients, the catalog manager and the storage units all may communicate using the link layer protocol. Communication at this layer also reduces overhead due to memory copies performed to process encapsulated data for each layer's protocol. A bandwidth distributed network file system from Polybus Systems Corporation in Tyngsboro, Mass., may be used.

Having now described computer platforms for one embodiment, some additional operations and details of one embodiment will now be described.

In one embodiment, there are processes for maintaining the storage units and the data stored on the storage units. For example, fault recovery procedures may involve the creation of additional copies of a file. Additionally, files may be deleted or added based on the need for availability of, i.e., reliability of access to, the file. Finally, some maintenance procedures may involve deleting files on a storage unit, copying the files to another storage unit and removing the storage unit from the system. A file also may be archived, or removed from the system to archival storage. These processes will now be described in more detail in connection with FIGS. 5–9. Such data management processes may be performed by the catalog manager, another storage unit, or a client. The performance of these processes by a client would not occupy the resources of the catalog manager or storage units, which may be used for other more important tasks, such as replying to client requests for data.

Figure 5:
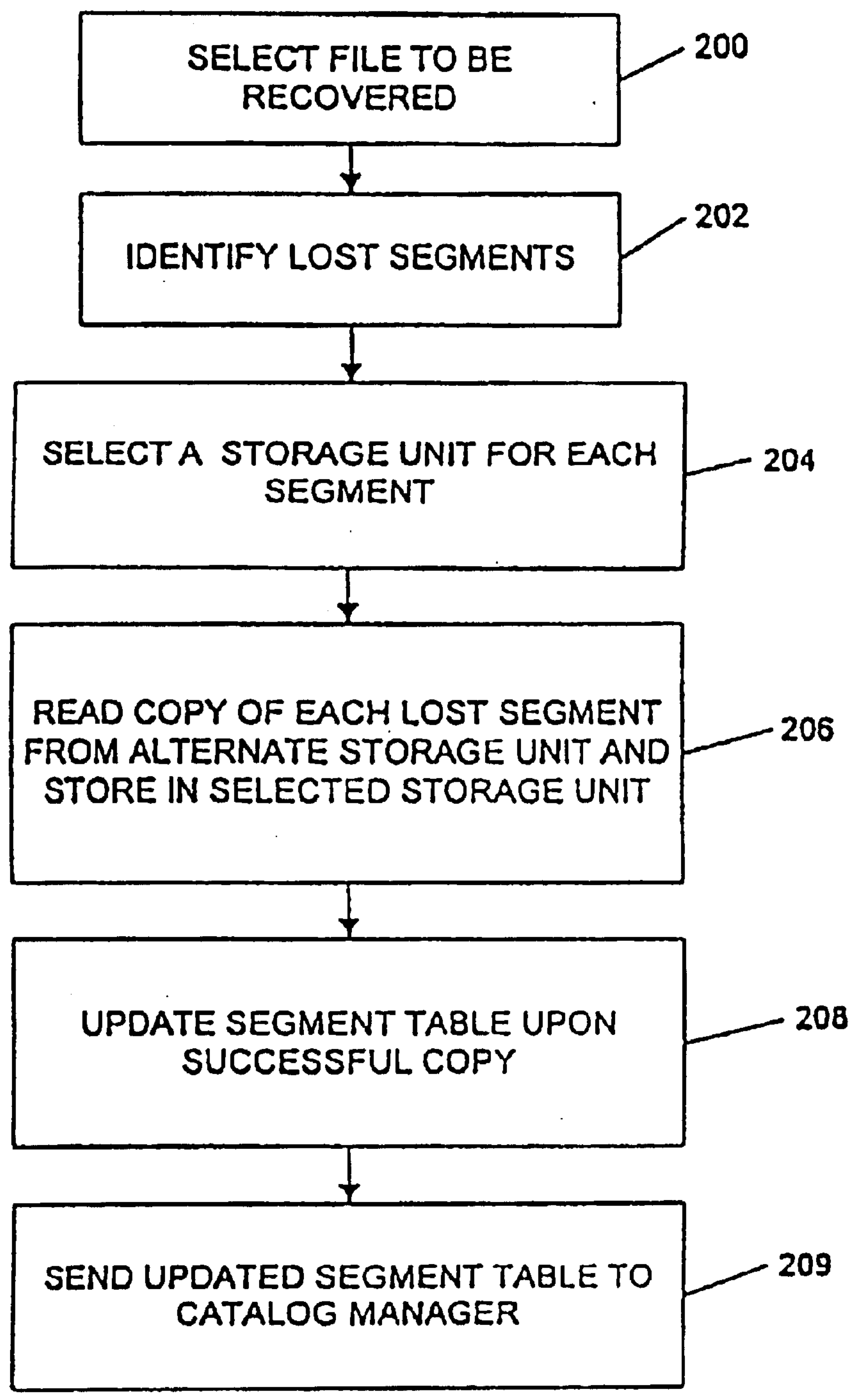
FIG. 5 is a flowchart describing how fault recovery may be performed when a storage unit becomes unavailable.
Figure 25:
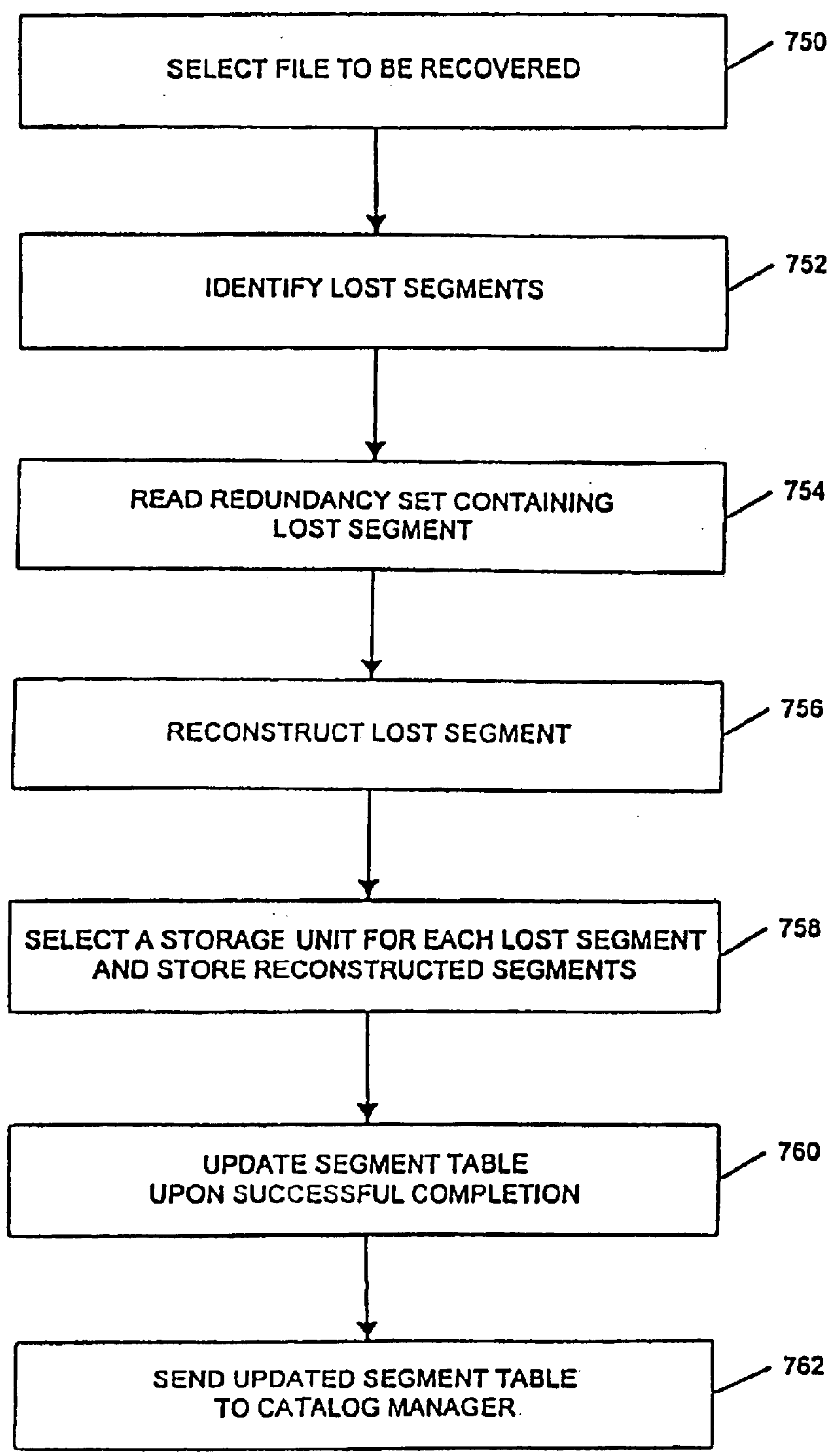
FIG. 25 is a flow chart describing how fault recovery may be performed when a storage unit becomes unavailable in another embodiment.

FIG. 5 is a flowchart describing in more detail how fault recovery may be performed when a storage unit becomes unavailable after its failure is detected. One way to detect such failure is described in more detail below in connection with FIGS. 10–12. Repeated failures to respond to requests also may be used to indicate failures. The success of this process depends on the number of copies of each segment within the system or a number of segments in a redundancy set. Given a number N of copies, then N−1 storage units may fail and the system still will operate without loss of data. After a storage unit fails, a new storage unit may be installed in its place, with lost data restored, or the lost data may be recreated and distributed over the remaining storage units. FIG. 5 describes a process for when the redundancy information is a copy of a segment. FIG. 25, described below, illustrates a process for when the redundancy information is based on two or more segments.

Additional copies of data may be made by first selecting the data, e.g., a file or source to be recovered, in step 200. The file to be recovered may be selected by a priority ordering, and may be selected either automatically or manually. This kind of recovery allows data from some files to be reconstructed and made available before data from other files is recovered. The lost segments of the data, i.e., those stored on the lost storage unit, are identified in step 202 using the segment table for the source. A new storage unit for each lost segment is selected in step 204, typically in the same manner as when data is originally captured, when a new storage unit is not available to replace the failed storage unit. Alternatively, the replacement storage unit is selected. A copy of the lost segment is read from an alternate storage unit in step 206 and stored in the selected storage unit. The file operations for steps 204 through 208 may be asynchronous and performed by separate threads for each segment. Such operation takes advantage of the many-to-many read/write capability provided in this network architecture. The segment table for the file then is updated upon the successful completion of the copy operation in step 208. When the process is complete, the catalog manager may be updated with the new segment table in step 209, if a catalog manager maintains the segment tables. If the original segment table was represented by a seed to a pseudorandom sequence generator, the actual table may need to be created and modified.

The speed of repopulation and redundancy restoration for an unloaded system using this process is defined by the following equation:

$$\frac{s}{(n-1+d)(b/2)},$$

where:

s=size of lost files in megabytes (MB), n=initial number of storage units, b=average bandwidth of storage units, expressed in MB/second, and d=user demand load, expressed in MB/second.

For example, if access to 50 gigabytes of storage is lost because one of ten storage units fails, then with n=10 storage units, with unit bandwidth b=10 MB/sec., then (n−1)=9 and (b/2)=5. Thus, recovery would take approximately 20 minutes with no other loads. This absolute recovery speed generally is reduced as a reciprocal of the varying playback load to clients, e.g., a 50% load results in 200% increase in repopulation time. When invoked, the redistribution task can run at a fast rate with multiple storage unit checkerboard switched to multiple storage units, but repopulation activities operate opportunistically, subordinated to client file service requests. The net effect is only a slight loss of total bandwidth of the storage units due to the failed storage unit. Prioritization of the file selection for recovery ensures that the most important files are recovered most quickly.

Recovery after failure of a storage unit also can be managed completely by the storage units that maintain the redundant data corresponding to the data on the failed storage unit and without a centralized control process that is described in connection with FIG. 5. A client application may detect that a storage unit has failed and avoid making requests to that storage unit. Also, the client may request an updated file map for any file or file segment for which its file map indicates a failed storage unit. To enable operational storage units to recover after failure of another storage unit, each storage unit may maintain a file map indicating, for each of its segments, the storage unit on which redundancy information is stored. When a failure of another storage unit is detected, the file maps may be searched by each storage unit to identify segments for which new redundancy information is to be generated and stored on another available storage unit. A storage unit may identify data it has stored and copy it to another randomly or pseudorandomly selected storage unit.

Figure 6:
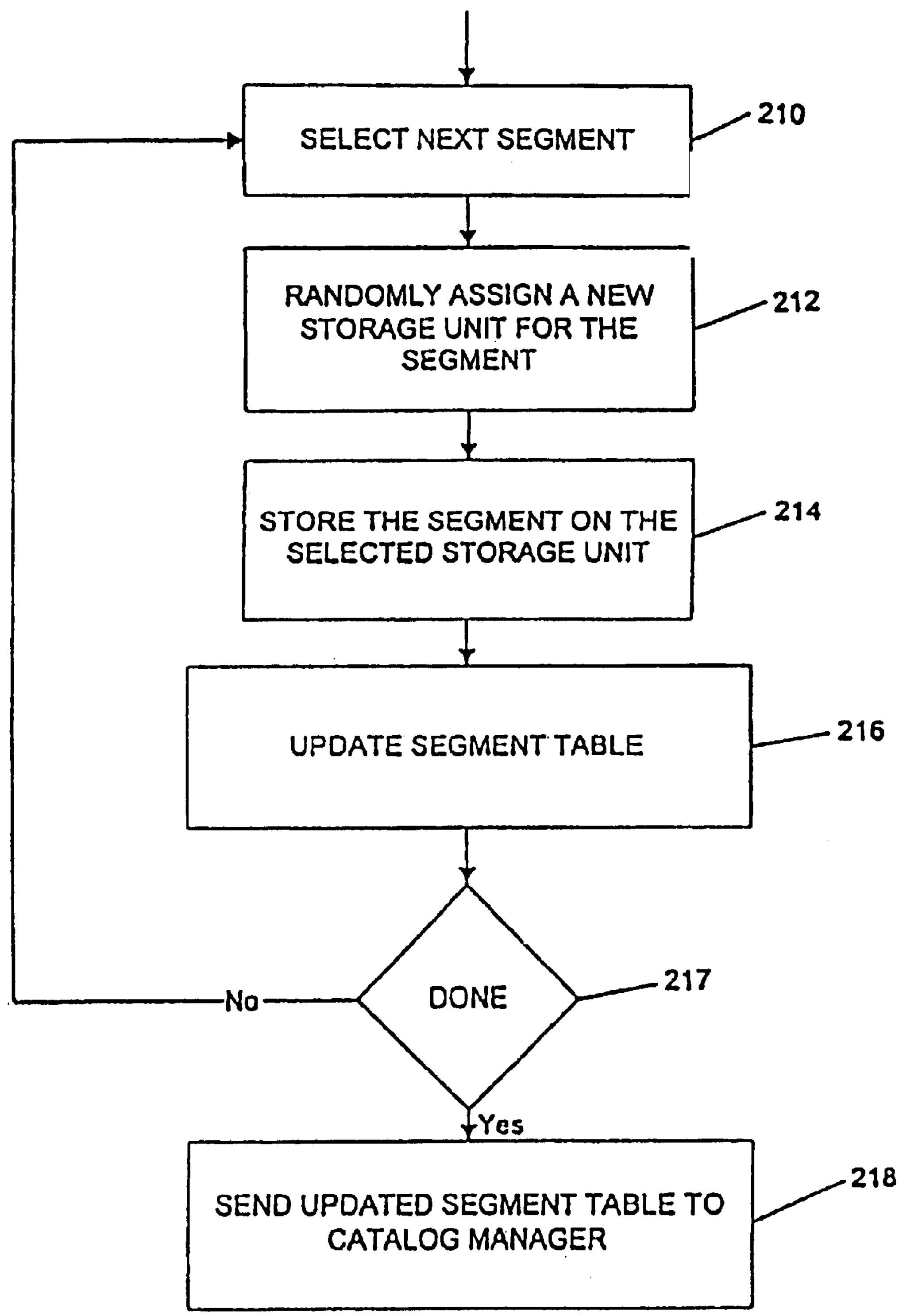
FIG. 6 is a flowchart describing how an additional copy of data may be made.

FIG. 6 is a flowchart describing in more detail how an additional copy of data may be made. This process may be invoked to make additional data copies available of mission critical or high-demand data. A date-stamp may be given to the new copy to indicate when the copy may be deleted. Given selected data, a segment of the data is selected in step 210. Each segment is assigned randomly a new storage unit in step 212, ensuring that each storage unit has at most one copy of a given segment. Next, the segment is stored on the selected storage unit in step 214. Upon successful completion of the storage of that segment, the segment table for the data is updated in step 216. If all of the segments of the data have not yet been copied, as determined in step 217, the process repeats by returning to step 210 to select the next segment of the data. When the process is complete, the catalog manager may be updated with the new segment table in step 218, if the catalog manager maintains the segment tables. Although this process is sequential over the segments, each segment may be processed using a separate thread, and the file operation of step 214 may be asynchronous. Such processing enables the copy to be made quickly. With this procedure, the segment table still may be represented using the seed for the pseudorandom number generator.

Figure 7:
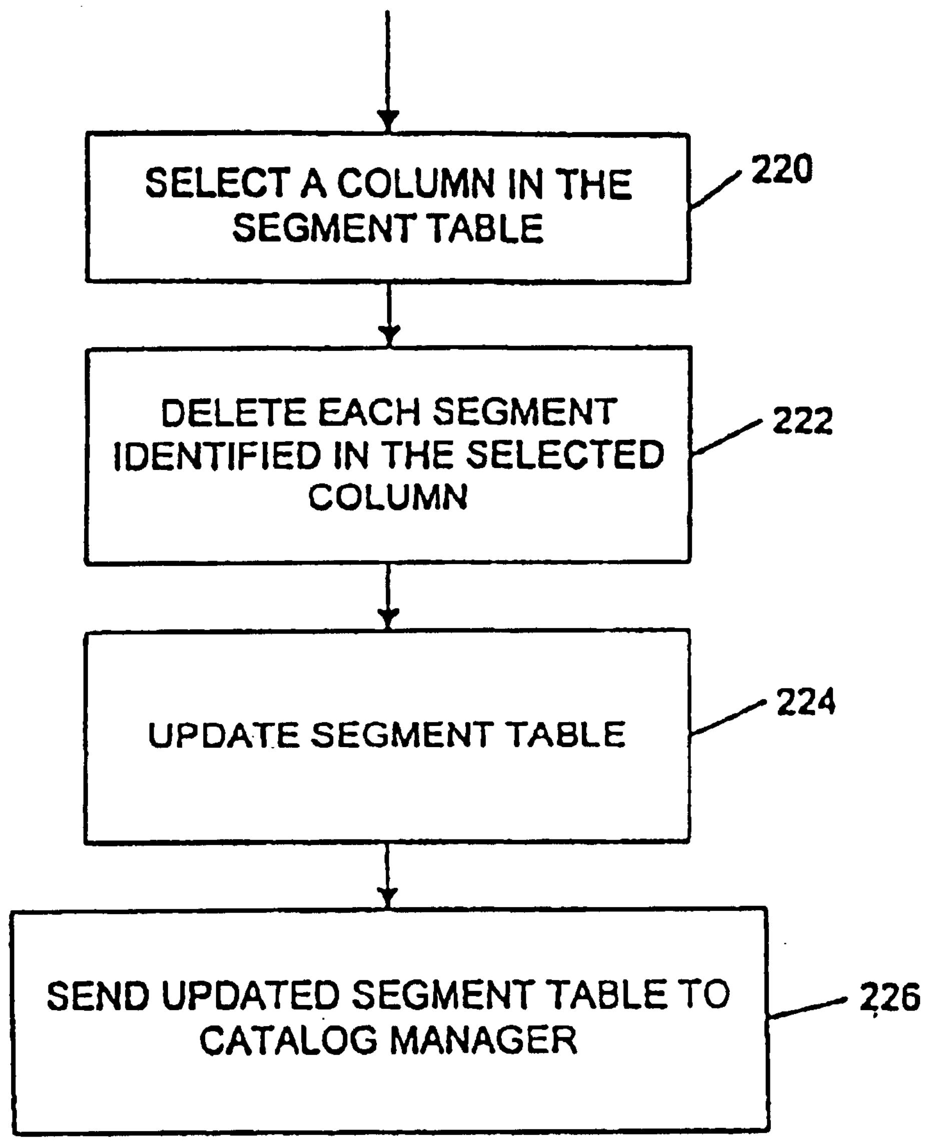
FIG. 7 is a flowchart describing how a copy of data may be deleted.

FIG. 7 is a flowchart describing in more detail how a copy of data is deleted. This process may be invoked, for example, when data is no longer in high demand. For example, a date stamp on a copy may be used to indicate when the data should be deleted. Given the segment table shown in FIG. 2 for given data, one of the sets of copies, i.e., a column in the table, is selected in step 220. Each segment in the column is deleted in step 222. Upon successful completion of the delete operation in step 222 for each segment, the segment table is updated in step 224. Steps 222 and 224 are repeated for segment. This process may be sequential over the segments or each segment may be processed by a separate thread. When the process is complete, the catalog manager may be updated with the new segment table in step 226, if the catalog manager maintains the segments tables.

Figure 8:
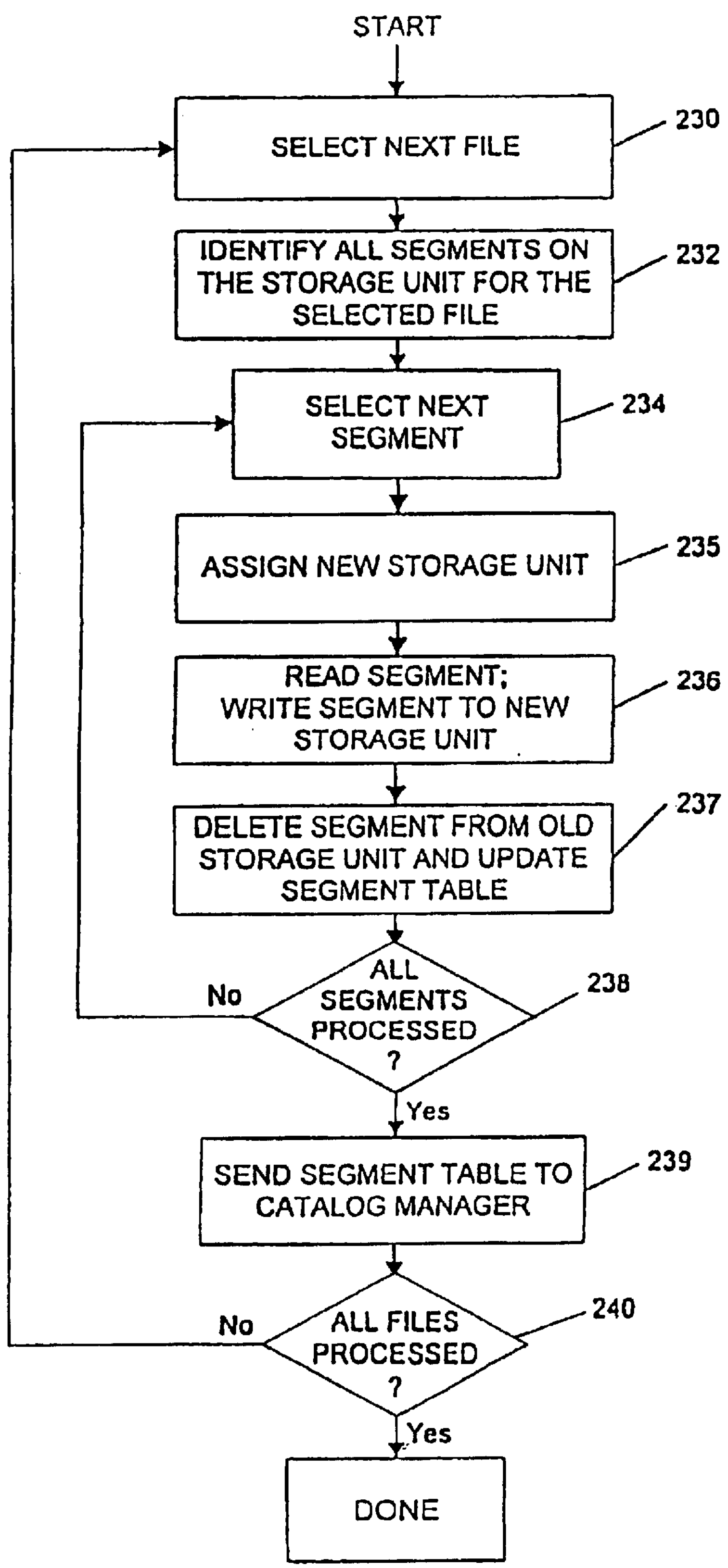
FIG. 8 is a flowchart describing how a storage unit may be removed from the system.

FIG. 8 is a flowchart describing how an otherwise active storage unit may be removed from the system. The data available on the storage unit is identified, for example by identifying a list of its files using its file system. First, the storage unit is made unavailable for writing new segments. This step may be accomplished, for example, by notifying the catalog manager or by sending a broadcast message to all clients. The segments of each file are redistributed on the other storage units before the storage unit is removed from the system. Given this list of files, the next file to be processed is selected in step 230. Using the segment table, all segments of this file on the storage unit, including segments containing redundancy information, are identified in step 232. The next segment to be processed is selected in step 234. The selected segment is assigned a new storage unit in step 235 by a random selection from the remaining storage units, assuring that no storage unit has more than one copy of a given segment. The data is then written to the newly selected storage unit in step 236. Upon successful completion of that write operation, the segment table is updated. When all the segments for a given file are redistributed, as determined in step 238, the segment table may be sent to the catalog manager if appropriate in step 239. The segments may be processed sequentially or by separate threads using asynchronous file operations. The segments may be deleted from the old storage unit after the catalog manager is updated. Processing continues with the next file, if any, as determined in step 240. If all files have been redistributed, this process is complete and the storage unit may be removed from the system.

Figure 9:
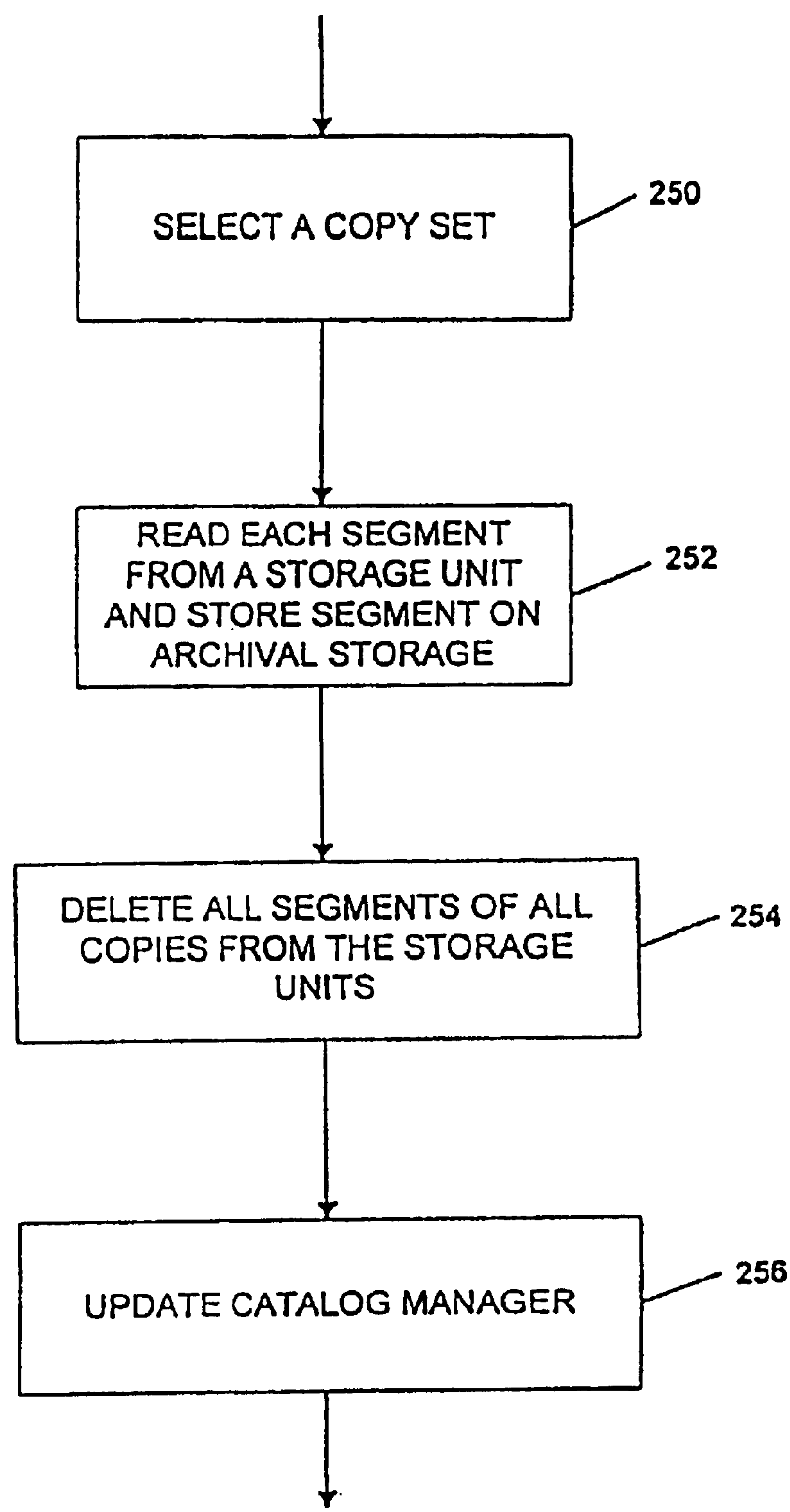
FIG. 9 is a flowchart describing how data may be archived or copied as a backup.

FIG. 9 is a flowchart describing how data may be archived or copied for backup. This process involves copying of one copy of each segment of the data from the available storage units into a backup storage system, such as an archival storage medium. Each copy set and any redundancy information also may be deleted from all storage units. This process may be performed by selecting a copy set, e.g., the A list, from a column of the segment table in step 250. Alternatively, each segment may be read in order and the selection of a storage unit for each segment may be performed using techniques applied by other applications as described above. Each segment from the selected copy set is read from its storage unit and is stored on a storage medium in step 252. Upon successful copying of each segment to the storage medium, all of the remaining segments from all the remaining copy sets or any redundancy information may be deleted from the storage units in step 254. The segments may be processed sequentially or by separate threads using asynchronous file operations. The catalog manager then may be updated in step 256.

Figures 10, 11:
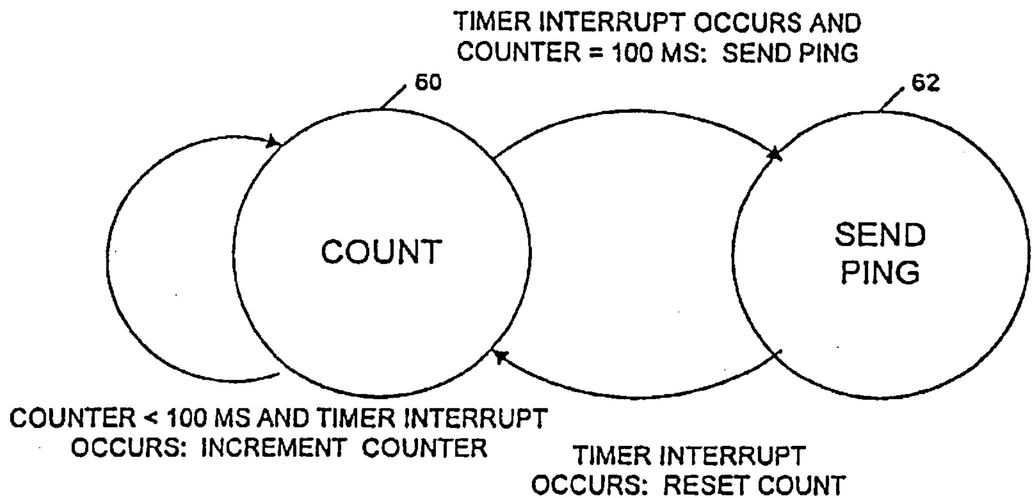
FIG. 10 is state diagram of a process on a storage unit for notifying a catalog manager of availability of the storage unit.
FIG. 11 illustrates a list of storage units which may be maintained by a catalog manager.
Figures 12, 13:
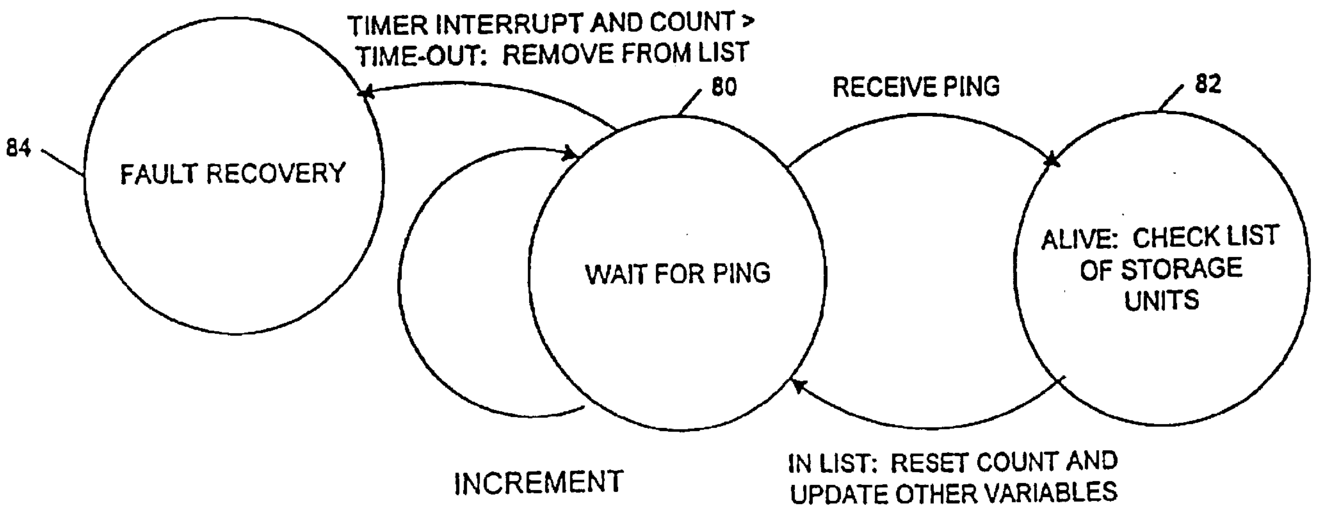
FIG. 12 is a state diagram illustrating how the catalog manager may monitor a storage unit.
FIG. 13 illustrates a table for tracking equivalency of media data files.

How the storage units may be monitored to determine availability and to detect failures will now be described in connection with FIGS. 10 through 12. There are several ways to determine whether storage units are available, including polling the storage units, handling exceptions from the storage units, or by the storage units periodically informing an application or applications of their availability. In one embodiment, in addition to the catalog manager 49 or some other client both may monitor which storage units 42 are active in the system and maintain a catalog of segment tables for each file. One method for monitoring the storage units is shown in FIGS. 10–12. Each storage unit available on the system establishes a process which periodically informs the catalog manager that it is available. In particular, this process may be considered a state machine having a first state 60 in which the storage unit periodically increments a counter, for example, in response to a timer interrupt or event from a system timer. When this counter reaches a certain predetermined amount, such as a hundred milliseconds, a transition to another state 62 occurs. In the transition to state 62, a signal, called a "ping," is sent to the catalog manager by the storage unit. This signal may be a small message, even one ATM cell, that does not use much bandwidth to transmit. This signal may include an identifier of the storage unit, and possibly other information such as the capacity, efficiency and/or bandwidth availability of the storage unit. At the next timer interrupt or event, the counter is reset and a transition back to state 60 occurs.

The catalog manager may keep track of the available storage units. For this purpose, the catalog manager may use a list 70 of storage units, an example of which is shown in FIG. 11. This list of storage units may be implemented as a table indexed by the identifiers of the storage units as indicated at 72. If the storage unit is present or available, the bandwidth, memory capacity or other information about the power of the storage unit is made available in column 74. The count since the last "ping" from the storage unit also is present as indicated in column 76. If this count exceeds a predetermined amount, such as three hundred milliseconds, the storage unit is considered out of service and fault recovery procedures, such as described above, may be followed. An example tracking process which maintains the list of storage units will now be described in more detail in connection with FIG. 12.

FIG. 12 is a state machine describing a tracking process which may be performed by the catalog manager to determine which storage units are available. One of these state machines may be established for each storage unit as a process on the catalog manager. The first state 80 is a waiting state in which the count value 76 for the storage unit in the list 70 of storage units is incremented for the storage unit in response to periodic timer interrupts. When a "ping" is received from the storage unit, the transition occurs to state 82. In state 82, the presence of this storage unit in list 70 is verified. If the storage unit is in the list 70, the count 76 for the storage unit is reset, other information about the storage unit may be updated, and a transition back to state 80 occurs. For example, when indicating that a storage unit is active, the storage unit also may indicate whether it has free space for storage or whether it is full or near capacity. If the storage unit is not in the list, it is added to the list with a reset count and a transition back to state 80 occurs. After a given increment, if the count for the storage unit is greater than a predetermined time out value, such as three hundred milliseconds, fault recovery procedures are performed. In particular, the storage unit is removed from list 70 and fault recovery procedures are performed in state 84. If a "ping" from a storage unit is received by the catalog manager and if that storage unit does not have a corresponding tracking process, then the catalog manager adds the storage unit to the list and creates a tracking process for the storage unit. When a new storage unit is added, a target capacity may be determined and one or more other storage units may be instructed to transfer some of its data to the new storage unit.

In addition to having a catalog manager 49, the system also may include a database, called an asset manager, which stores a variety of data about the media sources available in the system such as an index for each file. The catalog manager and asset manager also may be combined. One useful kind of information for storing in the asset manager is a table, shown in FIG. 13, that relates equivalent data files based on a source identifier and a range within that source, such as shown in U.S. Pat. No. 5,267,351. The source identifier is an indication of the original source of data, which may be an analog source, whereas the data actually available is a digitized copy of that source stored on the storage units. In particular, the table has an entry for a source identifier 100, a range within the source identifier 102, and an indication 104, such as list of data files, of equivalent data from that source. The list 104 may be used to identify one of the data files for a source, and in turn access the segment table for that file to determine where segments of the data are distributed on the various storage units. The segment table 90A of FIG. 2A may be incorporated into this list 104 of FIG. 13 as shown at 106 and 108. The segment table 90B of FIG. 2B similarly may be incorporated into list 104. Such equivalency among data also may be maintained by any application program.

Since the catalog manager is a database that monitors how data is distributed on the various storage units, it also should be designed to enhance fault tolerance and availability and to reduce its likelihood of being a bottleneck. Accordingly, the catalog manager should be implemented using conventional distributed database management techniques. Also, highly available machines, such as those from Marathon Technologies, Tandem Computers, Stratus, and Texas Micro, Inc., may be used to implement the catalog manager. There also may be several catalog managers that are used by separate client applications. Alternatively, each client application may maintain its own copy of catalogs locally, using standard techniques to maintain consistency between multiple copies of the data. In this manner, a catalog manager is not a central point of failure. A client also may act as its own catalog manager. The catalogs also may be treated as data of which its segments and redundancy information are randomly distributed among the storage units. Each client may have a segment table, or random number generator seed representing the segment table, for each catalog.

Having now described how data may be captured and stored onto storage units, and how the storage of data on the storage units may be managed, client applications that perform authoring and playback will now be described in more detail in connection with FIGS. 14 and 15.

There are several kinds of systems that may be used to author, process and display multimedia data. These systems may be used to modify the data, define different combinations of data, create new data and display data to a user. A variety of techniques are known in the art for implementing these kinds of systems.

Multimedia authoring, processing and playback systems typically have a data structure which represents the multimedia composition. The data structure ultimately refers to clips of source material, such as digitized video or audio, using an identifier of the source material, such as a unique identifier or a file name, and possibly a temporal range within the source material defining the clip. The identifier may be of a type that may be used with a list of equivalent data files to identify a file name for the source material. An index may be used to translate the temporal range in the source into a range of bytes within a corresponding file. This range of bytes may be used with the segment table for the file to identify segments of data that are needed and the storage units from which the data is retrieved.

Figure 14:
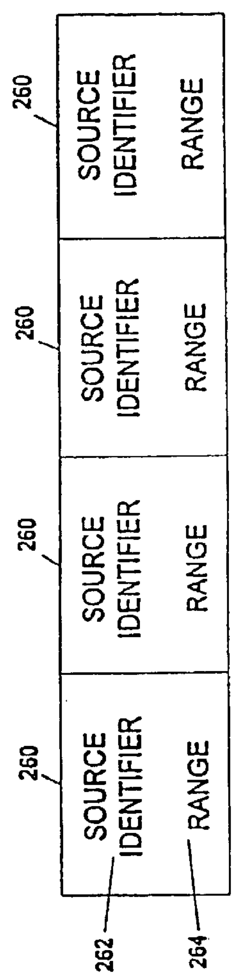
FIG. 14 illustrates a list structure for representing a motion video sequence of several clips.
Figure 15:
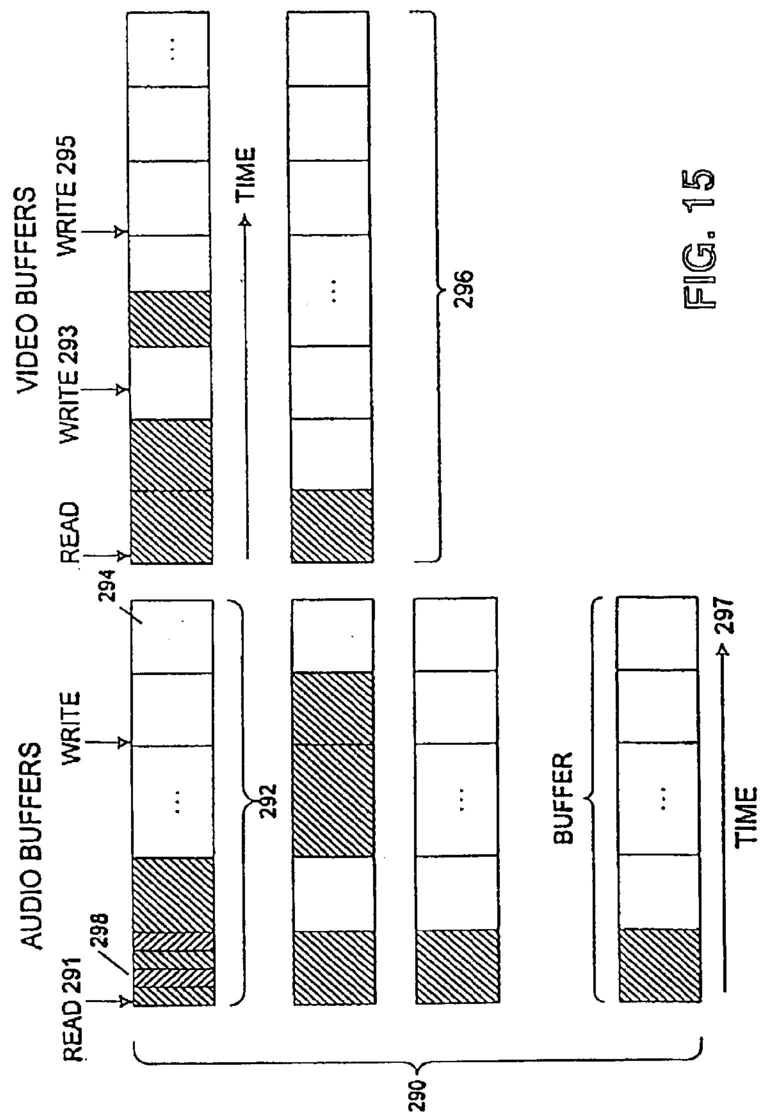
FIG. 15 illustrates a structure of buffer memories for supporting playback of two streams of motion video data and four streams of associated audio data at a client.

FIG. 14 shows an example list structure that may be used to represent part of a multimedia composition. In an example shown in FIG. 14, there are several clips 260, each of which includes a reference to a source identifier, indicated at 262, and a range within the source, as indicated at 264. Generally, there may be such a list for each track of media in a temporal composition. There are a variety of data structures which may be used to represent a composition. In addition to a list structure, a more complex structure is shown in PCT Published Application WO93/21636 published on Oct. 28, 1993. Other example representations of multimedia compositions include those defined by Open Media Framework Interchange Specification from Avid Technology, Inc., Advanced Authoring Format (AAF) from the multimedia Task Force, QuickTime from Apple Computer, DirectShow from Microsoft, and Bento also from Apple Computer, and as shown in PCT Publication WO96/26600.

The data structure described above and used to represent multimedia programs may use multiple types of data that are synchronized and displayed. The most common example is a television program or film production which includes motion video (often two or more streams or tracks) with associated audio (often four or more streams or tracks). As shown in FIG. 15, the client computer may have a corresponding set 290 of memory buffers 294 allocated in the main memory. Each buffer may be implemented as a "serializing" buffer. In other words, the client inserts data received from a storage unit into these independently accessible portions and reads from the set of buffers sequentially. Since requests may be sent to several storage units and data may be received at different times for the same stream, the buffers may not be filled in sequence when written, but are read out in sequence to be displayed. In FIG. 15, the filled in buffers indicate the presence of data in the buffer. Any empty buffer may be filled at any time as indicated at 293 and 295. However, each set of buffers has a current read location 291 from which data is read and which advances as time progress as indicated in 297. A subset 292, 296 of these buffers may be allocated to each stream of data.

Each buffer in the set of buffers has a size that corresponds to a fixed number of segments of data, where the segment size is the size of file segments stored on the storage units. There may be several, e.g., four, audio buffers per stream 292 of audio data, where each buffer may contain several, e.g., four, segments. Similarly, each video stream 296 may have several, e.g., four, buffers each of which contains several, e.g., four, segments. Each of the buffers may be divided into independently accessible portions 298 that correspond in size to the size of data packets for which transfer is scheduled over the network.

Because the video and audio data may be stored in different data files and may be combined arbitrarily, better performance may be obtained if requests for data for these different streams on the client side are managed efficiently. For example, the client application may identify a stream for which data can be read, and then may determine an amount of data which should be read, if any. A process for performing this kind of management of read operations is shown in U.S. Pat. No. 5,045,940. In general, the client determines which stream has the least amount of data available for display. If there is a sufficient amount of buffer space in the set of buffers for that stream to efficiently read an amount of data, then that data is requested. It is generally efficient to read data when the available space in memory for the selected stream is large enough to hold one network transmission unit of data. When it is determined that data for a stream should be requested, each segment of the data is requested from a storage unit selected from those on which the segment is stored.

Figure 16:
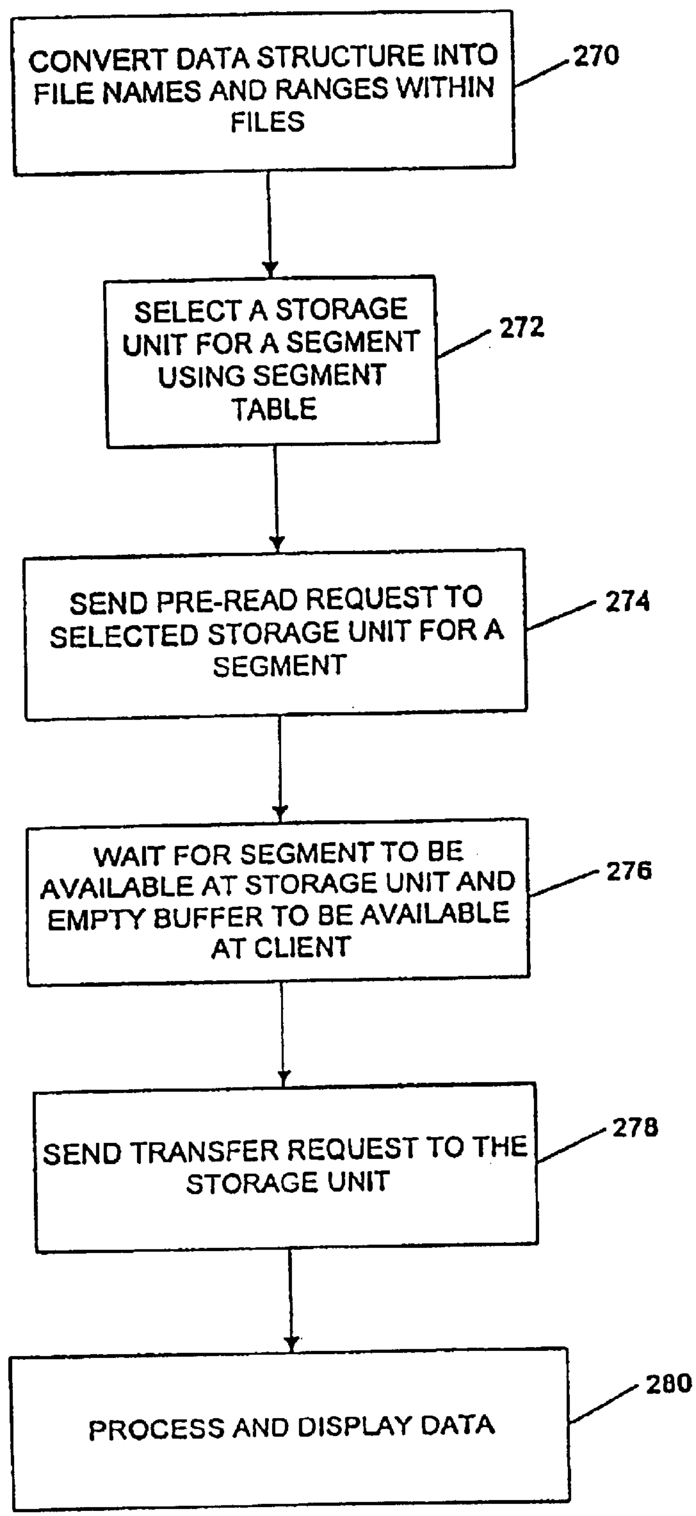
FIG. 16 is a flowchart describing how a client may process a multimedia composition into requests for data from a selected storage unit.

A general overview of a process by which a composition may be converted into requests for data in order to display the data will now be described in connection with FIG. 16. In order to know what files to request from the storage unit, an application program executed on the client system may convert a data structure representing a composition, such as shown in FIG. 14, into file names and ranges within those files in step 270 in FIG. 16. For example, for each source identifier and range within that source, a request may be sent to the asset manager. In response, the asset manager may return a file name for a file containing equivalent media corresponding to the received source identifier and range. The segment table for the file and the list of available storage units also may be catalog manager.

When the client requests a segment of data for a particular data stream, the client selects a storage unit, in step 272, for the segment that is requested. This selection, in one embodiment where the redundancy is provided by copying each segment, will be described in more detail below in connection with FIGS. 17 and 18. In general, the storage unit with the shortest queue 48 (FIG. 1) may be selected. The client then reads the data from the selected storage unit for the segment, in steps 274 through 278. Step 274 may be understood as a pre-read step in which the client sends a request to a storage unit to read desired data from nonvolatile storage into faster, typically volatile storage. The request to the storage unit may include an indication of how much time is required from the time the request is made until that requested data must be received at the client, i.e., a due time. After a pre-read request is accepted, the client waits in step 276. The request is placed in the storage unit's queue 48, and the due time may be used to prioritize requests as described below. Data is transferred from the storage unit in step 278 after data becomes available in a buffer at the storage unit. This step may involve scheduling of the network usage to transfer the data to maximize efficiency of network utilization. The received data is stored in the appropriate buffer at the client, and ultimately is processed and displayed in step 280. If the segment is lost at the storage unit, the redundancy information may be used to reconstruct the segment.

There are several ways to initiate the pre-read requests, including selection of a storage unit, in step 274 and the data transfer in step 278. For example, the MediaComposer authoring system from Avid Technology, Inc., of Tewksbury, Mass., allows a user to set either a number of clips or an amount of time as a look-ahead value, indicating how far ahead in a composition the application should initiate read requests for data. A program schedule for a television broadcast facility also may be used for this purpose. Such information may be used to initiate selection of a storage unit and pre-read requests. Such pre-reads may be performed even if buffer space is not available in buffers 290 (FIG. 15), as is shown in European patent application 0674414A2, published Sep. 9, 1995. The amount of available space in the buffers 290 (FIG. 15) may be used to initiate data transfers in step 278 (FIG. 16), or to initiate both pre-reads (step 274) and data transfers (step 278).

Figure 17:
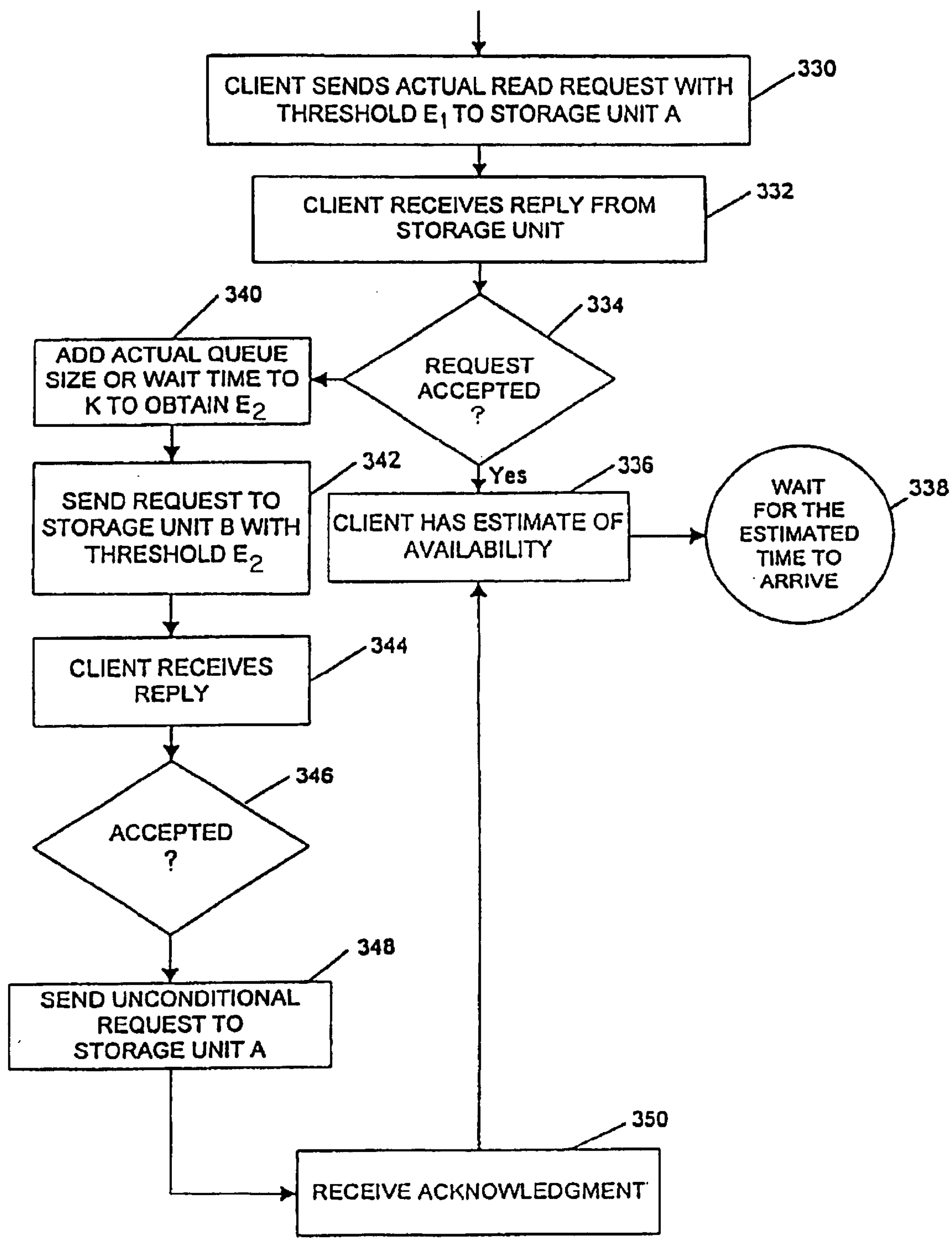
FIG. 17 is a flowchart describing how a client requests a storage unit to transfer data from primary storage into a buffer in one embodiment.
Figure 18:
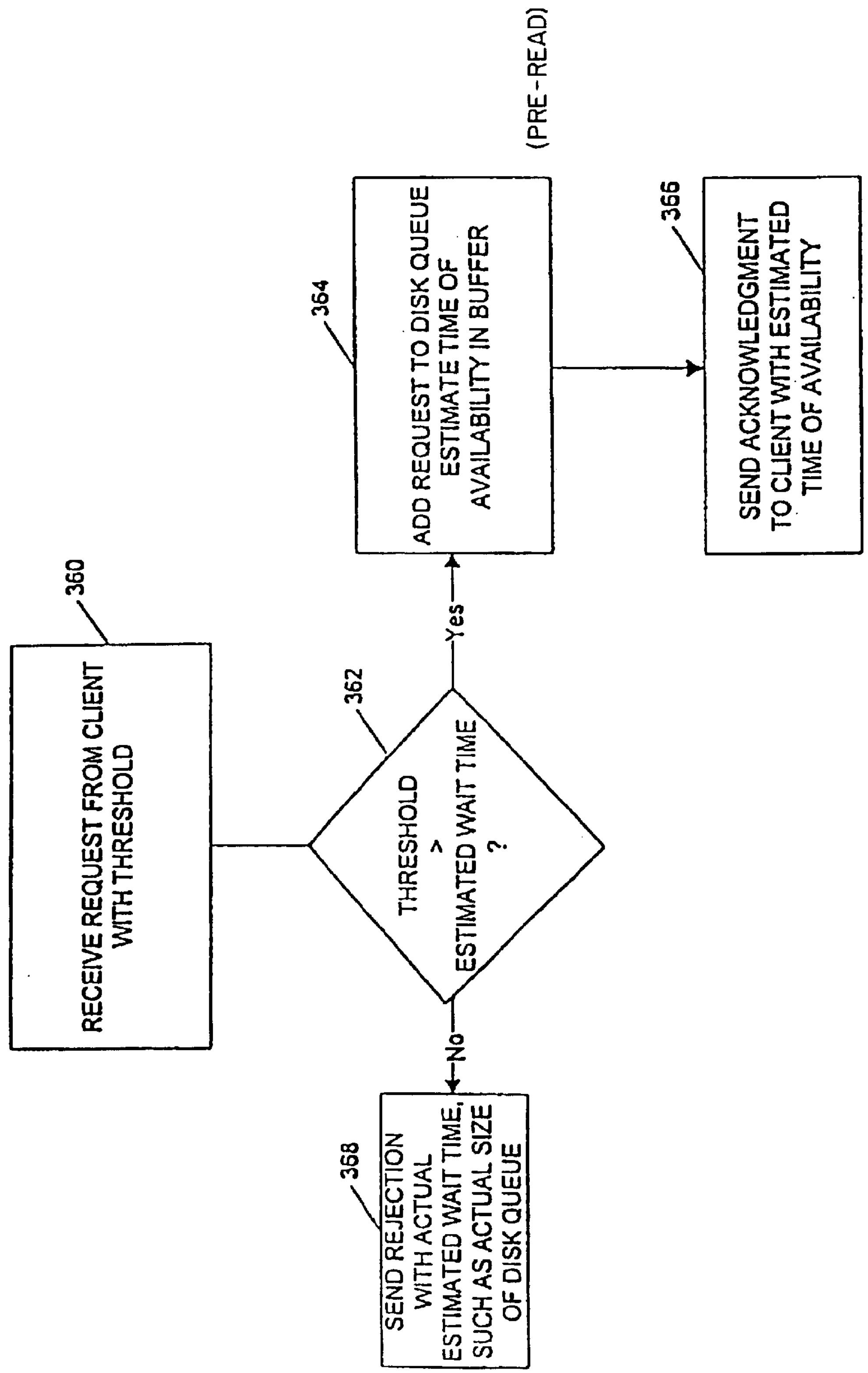
FIG. 18 is a flowchart describing how a storage unit replies to requests from a client in FIG. 17.

One process which enables a client to make an adequate estimate of which storage unit has the shortest queue of requests, without requiring an exhaustive search of all the available storage units, will now be described in connection with FIGS. 17 and 18. First, the client sends a request with a threshold E1 to a first storage unit in step 330. The threshold E1 is a value indicating an estimate of time by which the request should be serviced. This estimate may be expressed as a time value, a number of requests in the disk queue of the storage unit, such as four, or other measure. The meaning of this threshold is that the request should be accepted by the storage unit if the storage unit can service the request within the specified time limit, for example. The client receives a reply from the storage unit in step 332. The reply indicates whether the request was accepted and placed in the disk queue of the storage unit or whether the request was rejected as determined in step 334. If the request is accepted, the client is given an estimate of time at which the data will be available in a buffer at the storage unit in step 336. For example, if the data for the requested segment already is in a buffer, the storage unit indicates that the data is immediately available. The client then may wait until it is time to request transfer of the data (step 278 in FIG. 16) some time after the estimated time has passed. If the request is rejected, an estimate of the amount of time the storage unit actually is likely to take, such as the actual size in number of entries of the disk queue, is returned from the storage unit. This actual estimate is added to a value K to obtain a threshold E2 in step 340. The value K may be two, if representing a number of disk queue entries. Threshold E1 and value K may be user-definable. A request is sent to a second storage unit in step 342 indicating the threshold E2. The client then receives a reply in step 344, similar to the reply received in step 332. If this reply indicates that the request was accepted, as determined in 346, the client has an estimate of time at which the data will be available at the second storage unit, as indicated in step 336 after which the client may wait to schedule the data transfer. Otherwise, an unconditional request, one with a large threshold, is sent to the first storage unit in step 348. An acknowledgment then is received in step 350 indicating the estimate of time at which the data will be available in a buffer at the storage unit, as indicated at step 336.

The storage unit, on the other hand, does not know whether it is the first or second storage unit selected by the client when it receives a request. Rather, the storage unit simply receives requests as indicated in step 360. The threshold indicated in the request is compared to the storage unit's own estimate of the time the client will need to wait in step 362, for example by comparing the size of the disk queue of the storage unit to the specified threshold. If the threshold in the request is greater than the estimate made by storage unit, the request is placed in the disk queue and an estimate of the time when the data will be available in a buffer at the storage unit is determined in step 364. This estimate may be determined, for example, based on disk access speed, disk queue length and possibly a running average of recent performance. An acknowledgment is sent to the client in step 336 including the estimated time of availability of the data in the buffer at the storage unit. Otherwise, a rejection is sent in step 368 indicating this estimate, such as the actual size of the disk queue.

The storage unit may keep track of which segments are in which buffers on the storage unit. Segment data may be read from the storage medium into any free buffer or into a buffer occupied by the least recently used segment. In this manner, data for a segment may be immediately available in a buffer if that segment is requested a second time.

As an alternative, a client may use another method to select a storage unit from which data will be retrieved, as discussed below. After sending the request, the client may receive an acknowledgment from the storage unit indicating that the request is in the disk queue at the storage unit. Instead of receiving an estimate of time at which the data will be available in a buffer at the storage unit, the client may wait until a ready signal is received indicating that the storage unit has read the requested data into a specified buffer memory at the storage unit. During this waiting period, the client may be performing other tasks, such as issuing requests for other data segments, displaying data or processing data. One problem with this alternative is that the client accepts an unsolicited message, i.e., the ready signal from the storage unit, in response to which the client changes context and processes the message. The client could be busy performing other operations. Although this process does provide a more accurate estimate of the time at which data is available in a buffer at the storage unit, the ability to change contexts and to process incoming messages quickly involves more complexity at the client.

There are several other ways a storage unit may be selected from the segment table for a file when the segment table tracks copies of each segment. For example, when a client is making a file read request, the client may pick randomly from either the "A" list or "B" list for the file in question. Alternatively, the client may review all of its currently outstanding requests, i.e., requests sent but not yet fulfilled, and pick which storage unit out of the storage units on the A and B lists for the segment currently has the fewest outstanding requests. This selection method may reduce the chance of a client competing with its own outstanding requests, and tends to spread requests more evenly over all the storage units. Alternatively, rather than examining outstanding requests, a client may examine a history of its recent requests, e.g., the last "n" requests, and for the next request pick whichever storage unit from the A list and B list for the segment has been used less historically. This selection method tends to spread requests more evenly over all the storage units, and tends to avoid a concentration of requests at a particular storage unit. The client also may request from each storage unit a measure of the length of its disk queue. The client may issue the request to the storage unit with the shortest disk queue. As another possibility, the client may send requests to two storage units and ultimately receive the data from only one. Using this method on a local area network, the client may cancel the unused request. On a wide area network, the storage unit that is ultimately selected may cancel the unused request at the other storage unit.

A storage unit will likely receive multiple requests from multiple applications. In order to manage the requests from multiple applications to ensure that the most critical requests are handled first, a queue 48 (FIG. 1) is maintained for each storage unit. The queue may be maintained in several parts, depending on the complexity of the system. In particular, the storage unit may maintain different queues for disk access and for network transfers. The queue may segregate requests from time-sensitive applications using data having specific due times, e.g., for playback to broadcast, from requests from other applications, such as capture systems, authoring tools or service and maintenance applications. Storage requests may be separated further from requests from authoring tools and requests from service and maintenance programs. Requests from authoring tools may be separated further from service and maintenance requests.

Figure 19:
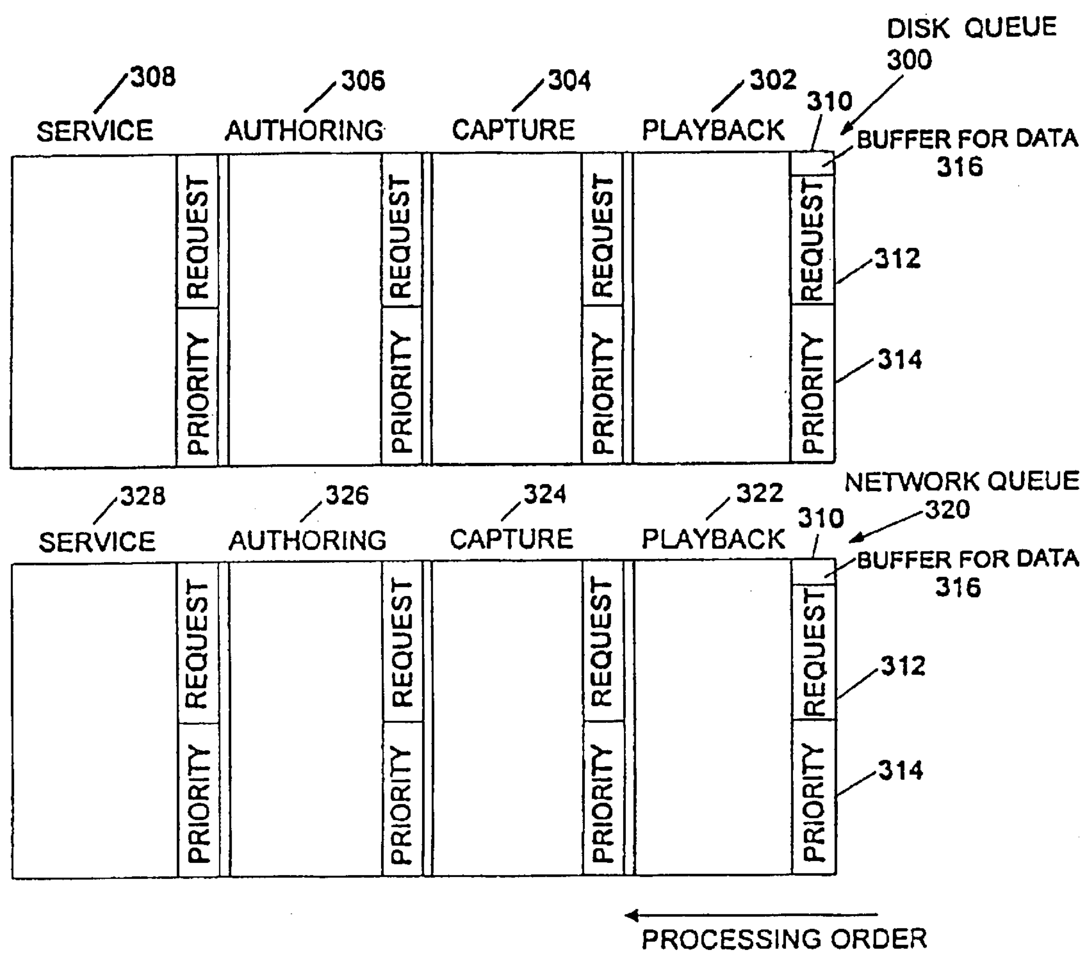
FIG. 19 illustrates example disk queues, for prioritizing requests for disk access to data, and network queues, for prioritizing requests for network transfers of data.

FIG. 19 illustrates one embodiment of queue 48, utilizing a disk queue 300 and a network queue 320. The disk queue has four subqueues 302, 304, 306 and 308, one for each of the playback, capture, authoring and service and maintenance client programs, respectively. Similarly, the network queue 320 has four subqueues 322, 324, 326 and 328. Each queue includes one or more entries 310, each of which comprises a request field 312 indicating the client making the request and the requested operation, a priority field 314 indicating the priority of the request, and a buffer field 316 indicating the buffer associated with the request. The indication of the priority of the request may be a deadline, a time stamp, an indication of an amount of memory available at the client, or an indication of an amount of data currently available at the client. A priority scheduling mechanism at the storage unit would dictate the kind of priority stamp to be used.

The priority value may be generated in many ways. The priority value for an authoring or playback system is generally a measure of time by which the application must receive the requested data. For example, for a read operation, the application may report how much data (in milliseconds or frames or bytes) it has available to play before it runs out of data. The priority indication for a capture system is generally a measure of time by which the client must transfer the data out of its buffers to the storage unit. For example, for a write operation, the application may report how much empty buffer space (in milliseconds, frames or bytes) it has available to fill before the buffer overflows. Using milliseconds as a unit of measure, the system may have an absolute time clock that could be used as the basis for ordering requests in the queue 48, and all applications and storage units may be synchronized to the absolute time clock. If such synchronization is not practical, the application may use a time that is relative to the application that indicates how much time from the time the request is made that may pass until the requested data should be received by the client. Assuming low communication latency, the storage unit may convert this relative time to an absolute time that is consistent with the storage unit.

The storage unit processes the requests in its disk queues 302–308 in their priority order, i.e, operating on the requests in the highest priority queue first, in order by their priority value, then the requests in successively lower priority queues. For each request, the storage unit transfers data between the disk and the buffer indicated by the request. For a read request, after the request is processed, the request is transferred from the disk queue to the network queue. For a write request, the request is removed from the disk queue after the write operation completes successfully.

In one embodiment to be described in more detail below, the storage unit uses the network queue to prioritize network transfers in the process of scheduling those transfers. In this embodiment, clients request transfer of data over the network. If a storage unit receives two such requests at about the same time, the storage unit processes the request that has a higher priority in its network queue. For a read request, after the request is processed, the request is removed from the network queue. For a write request, the request is transferred from the network queue to the disk queue, with a priority depending on the availability of free buffers, after the transfer completes successfully. If the time has passed for a request in the network queue to be processed, the request may be dropped indicating that the client is no longer operating or did not request the network transfer in time.

Data transfers between the storage units and clients over the computer network may be scheduled to improve efficiency. In particular, scheduling data transfers improves bandwidth utilization of the computer network. Such scheduling of the network usage should be performed particularly if the bandwidth of the link between a client and a switch is on the same order of magnitude as the bandwidth of the link between the storage unit and the switch. In particular, if the storage unit sends data and the client receives data at the link speed of their respective network connections, data is not likely to accumulate at a network switch or to experience other significant delays.

In order to enforce such utilization of the network, a mechanism may be provided that forces each client to receive data from only one storage unit, and that forces each storage unit to send data to only one client, at any given time. For example, each client may have only one token. The client sends this token to only one storage unit to request transfer of the data for a selected segment. The token may indicate the deadline by which the data must be received by the client, i.e., the priority measure, and the specified segment. Each storage unit sends data to only one client at a time, from which it has received a token. The storage unit only accepts one token at a time. After the data is transferred, the storage unit also returns the token.

Another network scheduling process will now be described in connection with FIGS. and 21. This process provides a similar result but does not use a token. Rather a client requests a communication channel with a storage unit, specifying a segment and an amount of time E3 that the client is willing to wait for the transfer to occur. The client also may specify a new due time for the segment by which the client must receive the data.

Figure 20:
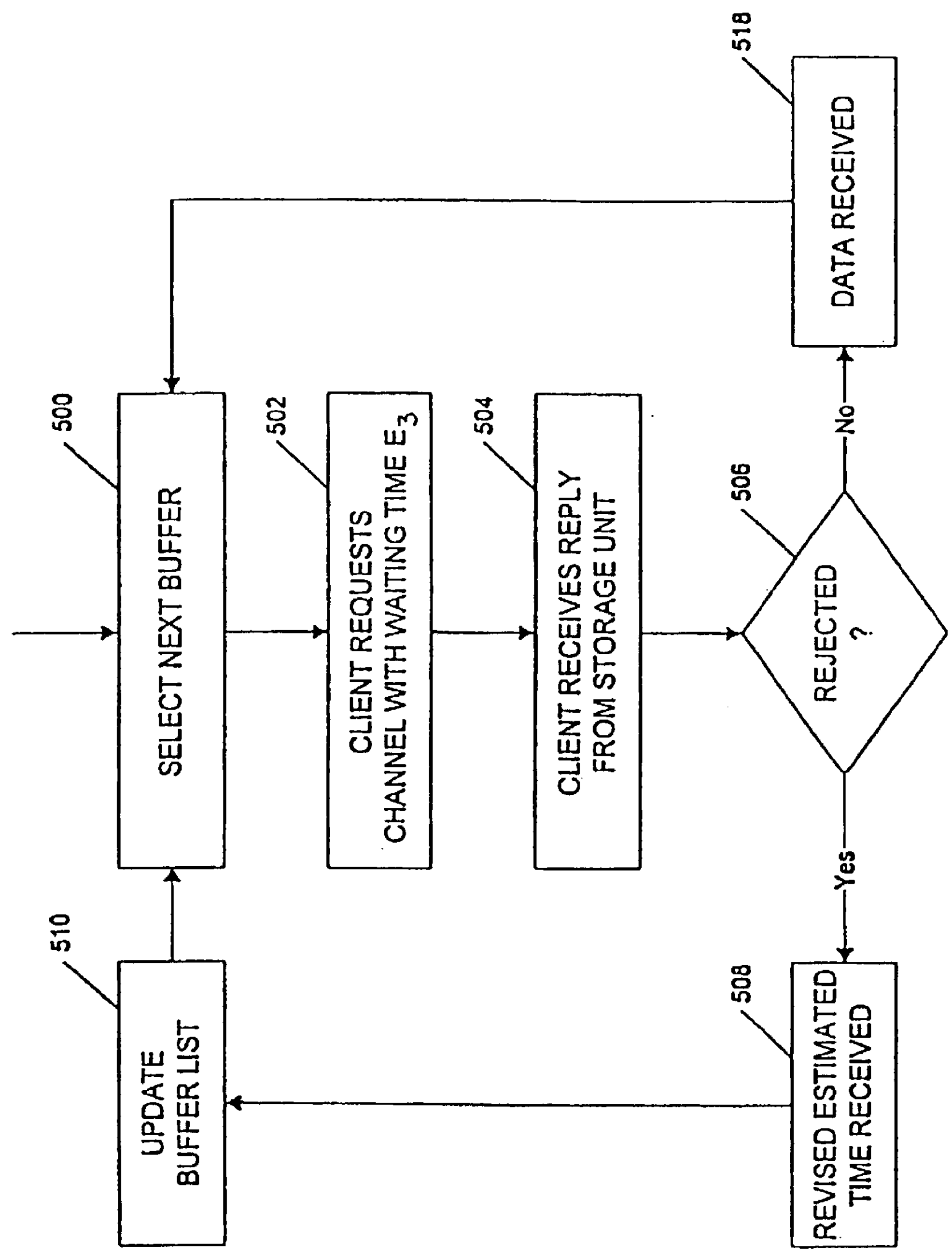
FIG. 20 is a flowchart describing how a client requests a storage unit to transfer data over the network in one embodiment.

Referring now to FIG. 20, the client process for transferring data over the network will now be described. At any point in time during the playback of a composition, each buffer has a segment of data associated with it and a time by which the data must be available in the buffer for continuous playback. As is known in the art, the application associates each of the buffers with a segment during the playback process. As shown above in connection with FIGS. 17 and 18, each segment that a client has preread has an associated estimated time by which the data will be available at the storage unit. Accordingly, the client may order the buffers by their due time and whether the requested data is expected to be available in a buffer at the storage unit. This ordering may be used by the client to select a next buffer for which data will be transferred in step 500. The client requests a communication channel with the storage unit in step 502, specifying a waiting time E3. This value E3 may be short, e.g., 100 milliseconds, if the client does not need the data urgently and if the client may perform other operations more efficiently. This value E3 may be longer if the client needs the data urgently, for example, so that it does not run out of data for one of its buffers. In step 504, the client receives a reply from the storage unit. If the storage unit indicates that the request is rejected, as determined in step 506, a revised estimated time is received with the message in step 508. This revised estimated time may be used to update the buffer list in step 510 from which buffers are selected. Processing returns to step 500 to select another buffer. A buffer for which the segment is on the same storage unit as the previously selected segment probably should not be selected. If the storage unit otherwise accepts the request, the data ultimately is received in step 518.

Figure 21:
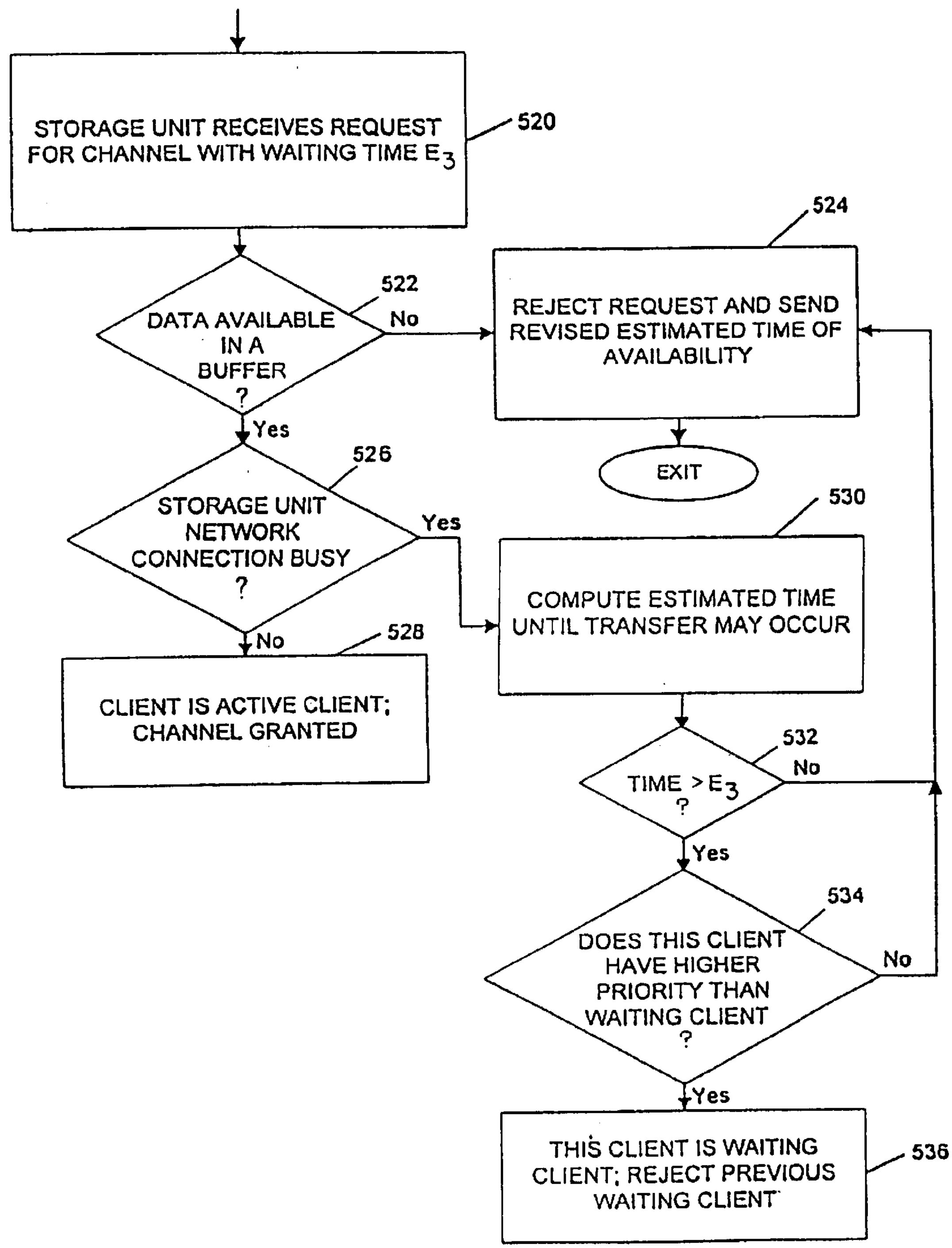
FIG. 21 is a flowchart describing how a storage unit processes requests to transfer data from multiple clients in one embodiment.

The process from the point of view of the storage unit will now be described in connection with FIG. 21. The storage unit receives a request from a client in step 520 indicating waiting time E3. If the data is not yet available in the buffers at that storage unit, as determined in step 522, the storage unit rejects the request in step 524 and computes a revised estimated time which is sent to the client. If the data is otherwise available and the network connection of the storage unit is not busy, as determined in step 526, then the client becomes an "active client" and the communication channel is granted by the storage unit in step 528, allowing data to be transferred. If the network connection of the storage unit is busy transferring data to another client, the storage unit maintains a request from a "waiting client," to which data is transferred after the data transfer for the "active client" is completed. In order to determine whether the current client should be the "waiting client," the storage unit estimates a time by which the transfer could occur, in step 530, based on the number of requests with earlier deadlines in the network queue multiplied by the network transmission time for each request. If the computed estimated time of availability is greater than the waiting time E3, indicating the client is not willing to wait that long, as determined in step 532, the request is rejected in step 524. Also, if the specified priority of this request is lower than the priority for any current waiting client, as determined in step 534, the request is rejected in step 524. Otherwise, the request from any current waiting client is rejected in step 536 and this new client is designated as the current waiting client. When a transfer to the active client is completed, the waiting client becomes the active client and the data is transferred.

Figure 22:
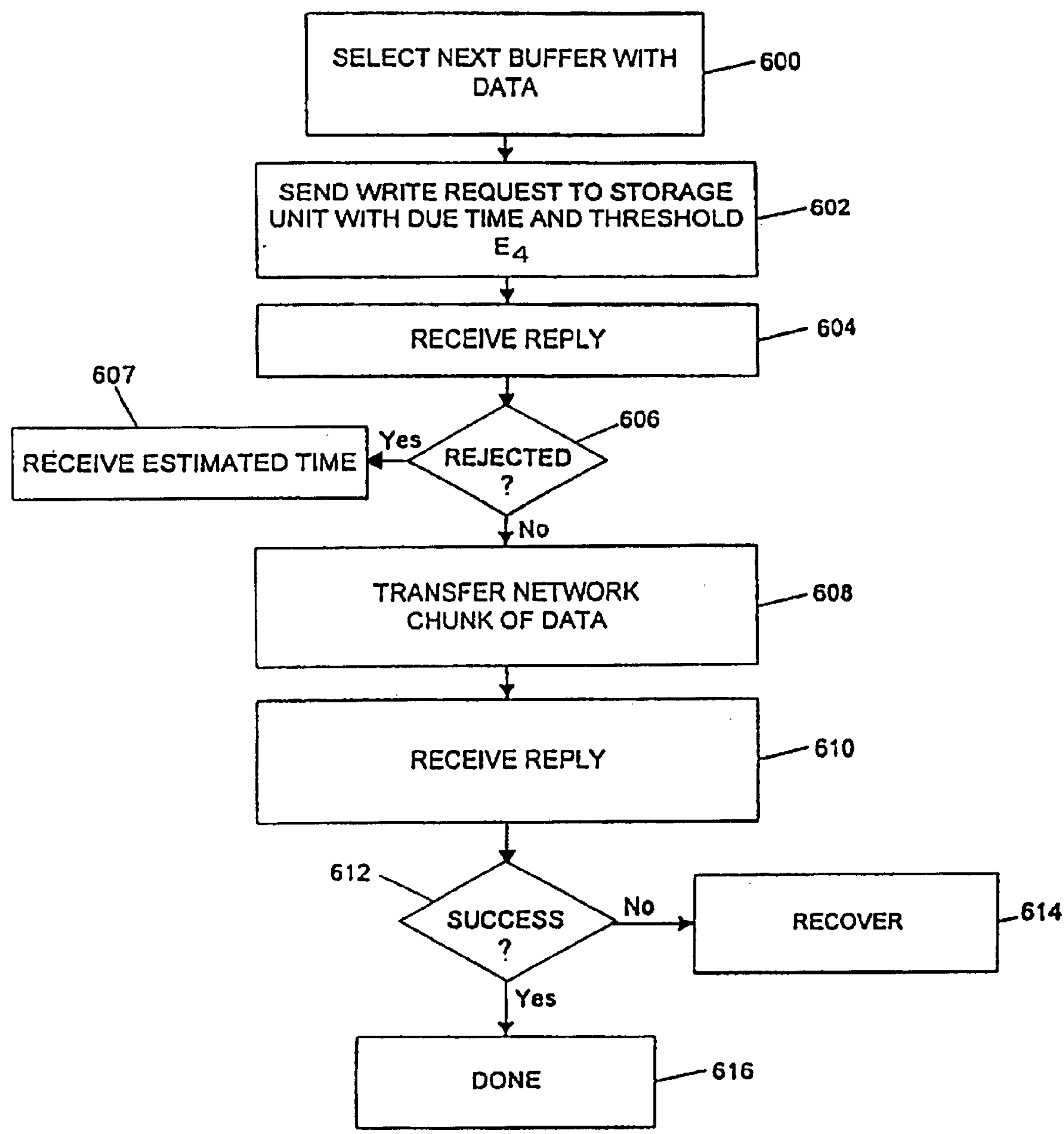
FIG. 22 is a flow chart describing an embodiment of a network scheduling process performed by a client for transferring data from the client to a storage unit.
Figure 23:
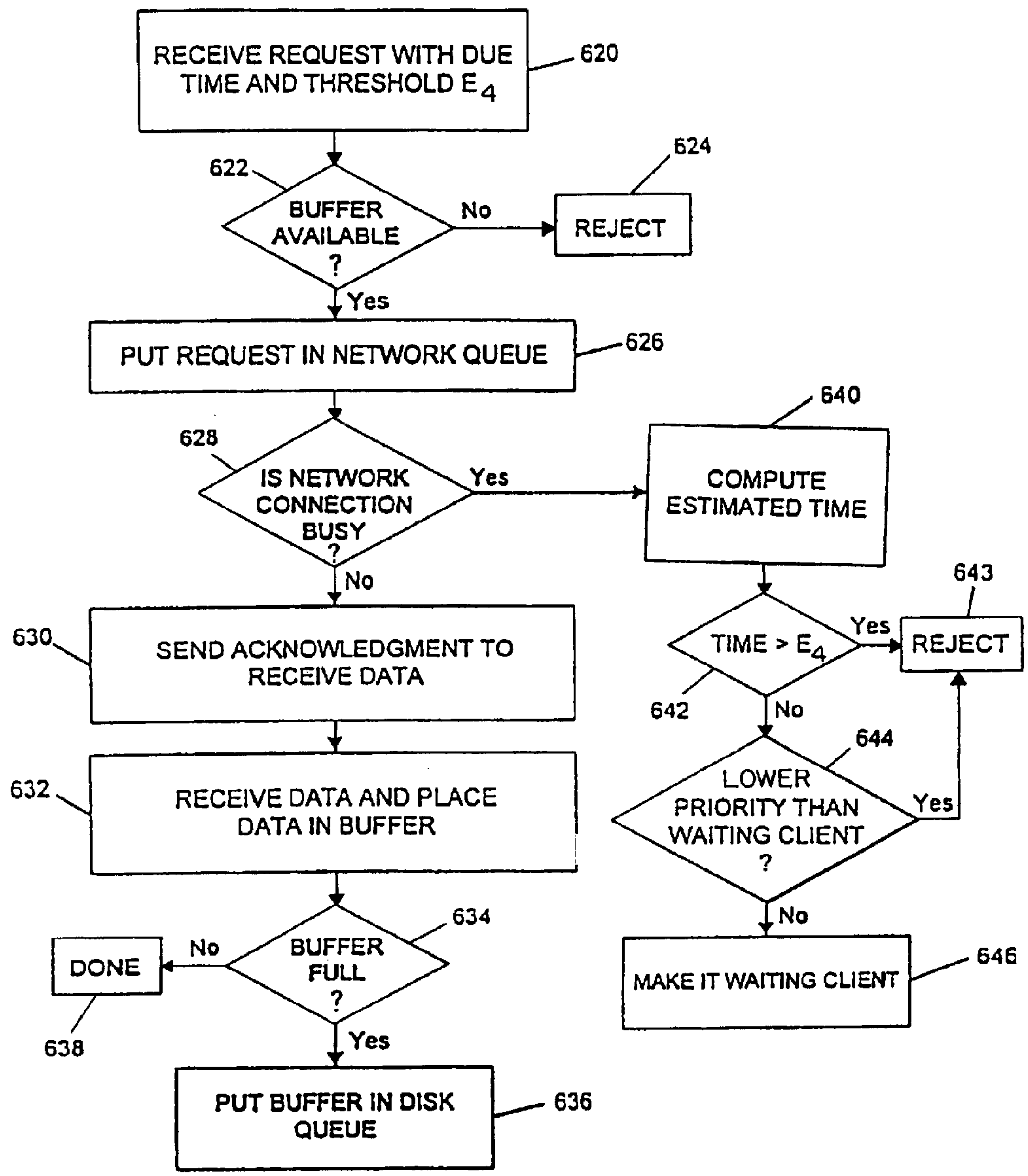
FIG. 23 is a flow chart describing an embodiment of a network scheduling process performed by a storage unit for transferring data from a client to the storage unit.

In order to transfer data from a client to a storage unit, a similar process may be used for scheduling the network transfer and for transferring the data from a buffer in the storage unit to nonvolatile storage. From the point of view of the client, this process will now be described in connection with FIG. 22. This process may be used to implement step 124 and 126 in FIG. 3.

Unlike the process of reading in which the client may place data into an arbitrary point within its set of buffers, the data to be transferred to a storage unit typically comes from a read pointer from a set of buffers used by the capture system. The capture system typically produces one or more streams of video information as well as one or more streams of audio information. Accordingly, the capture system may select one of the data streams according to the amount of free buffer space in the stream to receive captured data. This buffer at the current read pointer of the selected stream is selected in step 600. A write request is then sent to the storage unit in step 602. The request includes an identifier for the segment, a due time or other priority value, and a threshold E4 indicating an amount of time the client is willing to wait. The due time is used by the storage unit to prioritize network transfer requests. The threshold E4 is used by the client, similar to threshold E3 discussed above, to permit the client to efficiently schedule its own operations. The client, after sending the request to the storage unit, eventually receives a reply in step 604. If the reply indicates that the write request was rejected, as determined in step 606, the reply includes an estimated time by which the storage unit will be available to receive the data. This estimated time may be used by the client to schedule other operations. If the storage unit accepts the request to write the data, the client then sends, in step 608, a portion of the segment of the data to the storage unit. A reply may be received in step 610 indicating whether or not the write request was successful, as analyzed in step 612. A failure may involve recovery processes in step 614. Otherwise the process is complete as indicated in step 616.

From the point of view of the storage unit, the storage unit receives the write request from the client in step 620. The request indicates a due time or other priority stamp which is used to place the request within the network queue. The storage unit then determines in step 622 if a buffer is available for receiving the data. The storage unit may make such a buffer available. In the unlikely event that no buffers are available, the request may be rejected in step 624. Otherwise, a request is put in the network queue in step 626 indicating the buffer allocated to receive the data, its priority stamp, and other information about the transfer. Next, the storage unit determines if the network connection is busy in step 628. If the network connection is not busy, the storage unit accepts the request in step 630 and sends a message to this effect to the client. The client then transfers the data which is received by the storage unit in step 632 and placed in the designated buffer. If the designated buffer is now full, as determined in step 634, the buffer is placed in the disk queue with an appropriate priority stamp in step 636. The storage unit's processing of its disk queue will eventually cause the data to be transferred from the buffer to permanent storage. Otherwise, the storage unit waits until the client sends enough data to fill the buffer as indicated in step 638.

If the network connection of the storage unit is busy, as determined in step 628, the storage unit computes, in step 640, an estimated time by which the network connection of the storage unit should be available. If this computed time is greater than the indicated waiting time E4, as determined in step 642, the request is rejected in step 624 with an estimate of the time of availability of the storage unit. If the storage unit expects to be able to transfer the data within the waiting time E4 indicated by a client, the storage unit compares the priority of the request with the priority of a request for any currently waiting client, in step 644. If this request is of a lower priority than the request of the currently waiting client, the request is rejected. Otherwise, the request from the currently waiting client is rejected, and this new request is made the next request to be processed in step 646.

These processes for scheduling transfer of data over the network also may be used without using redundancy information and without using the methods of selection of a storage unit described above.

Additional embodiments for use when the redundancy information is created from two or more segments will now be described in connection with FIGS. 24 and 25.

Figure 24:
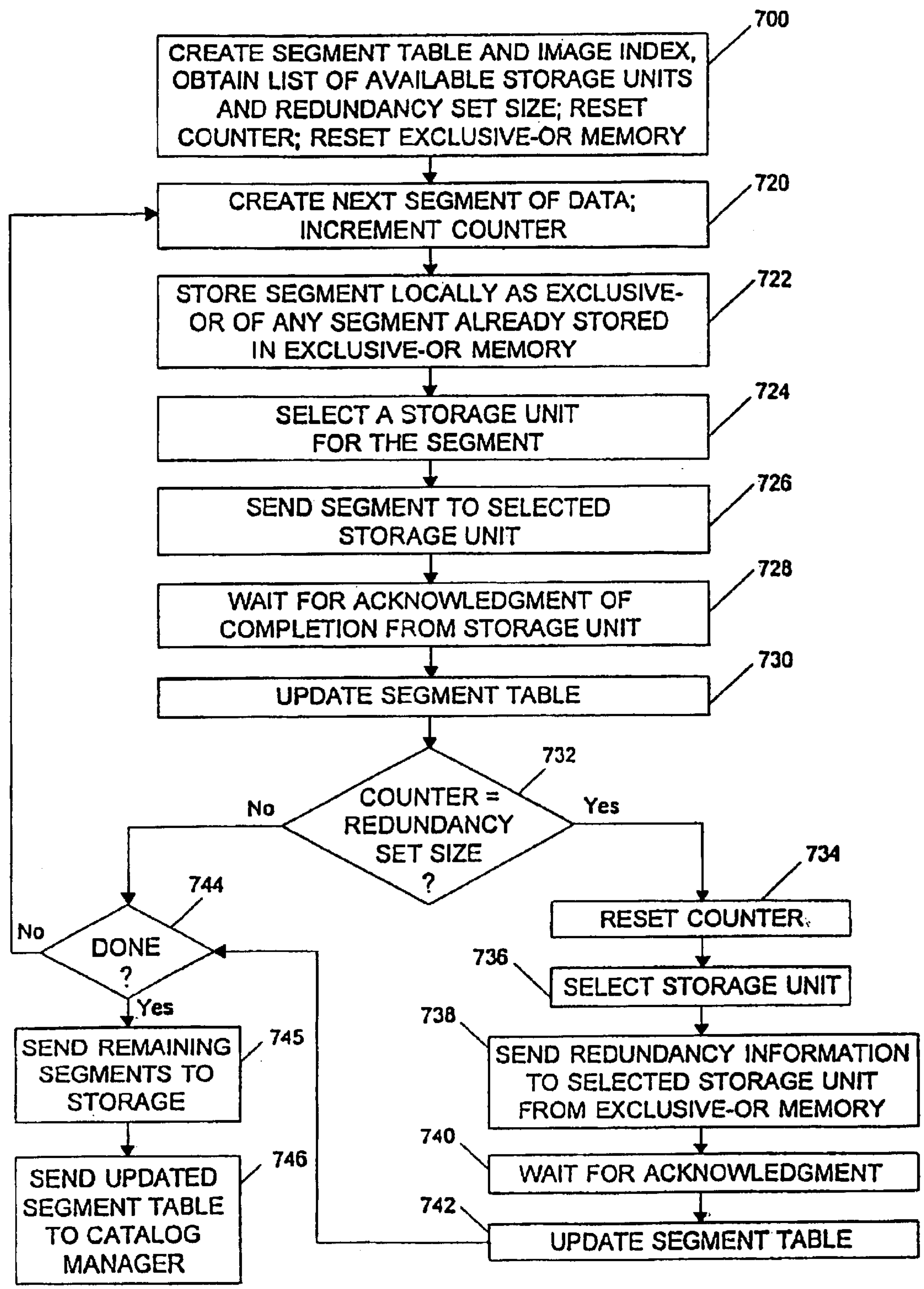
FIG. 24 is a flow chart describing how data may be captured and distributed among several storage units in another embodiment.

Referring now to FIG. 24, an example process for storing segments of data with redundancy information in a randomly distributed manner over several storage units will now be described in more detail. This process is generally similar to the process described above in connection with FIG. 3. First, in step 700, the capturing system creates a segment table 90B (FIG. 2B). An image index that maps each image to an offset in the stream of data to be captured, also typically is created. The indexed images may correspond to, for example, fields or frames of the video. The index may refer to other sample boundaries, such as a period of time, for other kinds of data, such as audio. The capturing system also obtains a list of available storage units, as described above. The capturing system also receives an indication of a redundancy set size, either automatically based on the list of available storage units or from a user. In general, the redundancy set size should be less than the number of available storage units, and may be a significantly smaller subset. A counter is also used to keep track of which segments are in a given redundancy set. This counter is reset to zero in step 700. An exclusive-or memory is also used, which is reset to all binary unasserted values, e.g., "0."

A segment of data is then created by the capturing system in step 720. An appropriate size for this segment was discussed above in connection with the description of FIG. 3. The counter is also incremented in step 720.

The current segment is stored locally as an exclusive-or of any segment already stored in the exclusive-or memory, in step 722. A storage unit is selected for the segment in step 724. Selection of the storage unit for a segment is random or pseudorandom. This selection may be independent of the selection made for any previous redundancy set. However, the selection should ensure that each segment in a redundancy set is stored on a different storage unit. Each file may use only a subset of the available storage units as discussed above in connection with the description of FIG. 3.

After a storage unit is selected for the segment, the segment is sent to the storage unit in step 726 for storage. The capture system then may wait for the storage unit to acknowledge completion of storage of the segment in step 728. When data must be stored in real-time while being captured, the data transfer in step 726 may occur in two steps, similar to read operations, as discussed above. After the data is successfully stored on the storage units, the segment table 90B is updated by the capturing system in step 730.

If the counter is currently equal to the redundancy set size, as determined in step 732, the contents of the local exclusive-or memory is the redundancy information. This redundancy information is then stored on the storage units. In particular, the counter is reset in step 734. A storage unit is selected for the redundancy information in step 736. The redundancy information is sent to the selected storage unit in step 738. The capturing system then waits for acknowledgment of successful storage in step 740. The segment table may then be updated in step 742.

If capture is complete, as determined in step 128, then the process terminates; at this time any redundancy information stored in the exclusive-or memory should be stored in a storage unit in step 745, using a procedure similar to step 734 through 742. The updated segment table is then sent to the catalog manager in step 746. If the counter is not equal to the redundancy set size in step 732, and if capturing is not complete as determined in step 744, process continues by creating the next segment of data and incrementing the counter in step 720.

As discussed above in connection with FIG. 5, the redundancy information allows data to be recovered if one of the storage units has failed. FIG. 25 illustrates a process for performing such failure recovery when the redundancy information is based on a redundancy set containing two or more segments. As in FIG. 5, a file to be recovered is selected in step 750. Any lost segments of that file are identified in step 752. The redundancy set containing a lost segment is then read in step 754. This step involves reading the redundancy information for the set created by exclusive-or of the segments in the set, and reading the remaining segments of the redundancy set. An exclusive-or of the remaining segments and the redundancy information is then computed in step 756 to reconstruct the lost segment. A storage unit for each reconstructed lost segment is then selected in step 758, similar to step 204 in FIG. 5. The reconstructed lost segments are stored in the selected storage units. The segment table is updated upon successful completion of the storage operations. The updated segment table is then sent to the catalog manager in step 762.

It is also possible to convert a file having one kind of redundancy information, e.g., a copy of the segment, to another kind of redundancy information, e.g., an exclusive-or of two or more segments. For example, an additional copy of data may be created using a process shown in FIG. 6. After this process is completed, the other form of redundancy information (the exclusive-or results of segments) may be deleted. Similarly, the process shown in FIG. may be used with stored data to create exclusive-or redundancy information. After creation of such information, any extra copy of data may be deleted using the process shown in FIG. 7. The form in which a file has redundancy information may vary from file to file and may be based on, for example, a priority associated with the file and an indication of the form of the redundancy information may be stored in the catalog manager.

By scheduling data transfers over the network and by distributing the load on the storage units with selected access to randomly distributed segments of data with redundancy information, this system is capable of efficiently transferring multiple streams of data in both directions between multiple applications and multiple storage units in a highly scalable and reliable manner, which is particularly beneficial for distributed multimedia production.

One application that may be implemented using such a computer network is the capability to send and return multiple streams to other external digital effects systems that are commonly used in live production. These systems may be complex and costly. Most disk-based nonlinear video editing systems have disk subsystems and bus architectures which cannot sustain multiple playback streams while simultaneously recording an effects return stream, which limits their abilities to be used in an online environment. Using this system, several streams may be sent to an effects system, which outputs an effects data stream to be stored on the multiple storage units. The several streams could be multiple camera sources or layers for dual digital video effects.

It is also possible to have multiple storage units providing data to one client to satisfy a client's need for a high bandwidth stream of data that has a higher bandwidth than any one storage unit. For example, if each of twenty storage units had a 10 MB/s link to a switch and a client had a 200 MB/s link to the switch, the client could read 200 MB/s from twenty storage units simultaneously, permitting transfer of a data stream for high definition television (HDTV), for example.

Using the procedures outlined above, storage units and clients operate using local information and without central configuration management or control. A storage unit may be added to the system during operation without requiring the system to be shut down. The storage unit simply starts operation, informs clients of its availability, and then establishes processes to respond to access requests. This expandability complements the capability and reliability of the system.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A process for transferring temporal media data over a network from a plurality of storage units for playback on a client, wherein the temporal media data is divided into segments distributed over the plurality of storage units, wherein each storage unit has persistent storage and one or more buffers for storing data read from persistent storage for transmission over the network;

wherein the client has a sequence of playback buffers, wherein each playback buffer temporarily stores a segment of the temporal media data before playback, and wherein data in the sequence of playback buffers is played back according to the sequence of the playback buffers, such that each playback buffer has a playback time, the process comprising:

issuing requests to the storage units to read segments of the temporal media data from the persistent storage into the one or more buffers on the storage units;

ordering empty playback buffers in the sequence of playback buffers by playback time and whether data for placement in each playback buffer is expected to be available in the one or more buffers in the storage units;

selecting the playback buffer with the earliest playback time and for which the data for placement in the playback buffer is expected to be available in the one or more buffers in the storage units; and accessing the storage units for the data for placement in the selected playback buffer;

repeating the steps of issuing, ordering, selecting and accessing during playback.

2. The process of claim 1, wherein the segments of the temporal media data are stored nonsequentially on the storage units.

3. The process of claim 2, wherein each segment of the temporal media data is stored on one of the storage units and a copy of the segment is stored on another of the storage units, the process further comprising, for each segment, selecting one of the storage units.

4. The process of claim 3, wherein each storage unit includes a queue of requests and the selected storage unit is the storage unit with approximately the shortest queue of requests.

5. The process of claim 4, in a system in which multiple clients access the storage units, further comprising ensuring that each storage unit sends data to only one client at a time and each client requests data from only one storage unit at a time.

6. The process of claim 1, wherein each segment of the temporal media data is stored on one of the storage units and a copy of the segment is stored on another of the storage units, the process further comprising, for each segment, selecting one of the storage units.

7. The process of claim 6, wherein each storage unit includes a queue of requests and the selected storage unit is the storage unit with approximately the shortest queue of requests.

8. The process of claim 7, a system in which multiple clients access the storage units, further comprising ensuring that each storage unit sends data to only one client at a time and each client requests data from only one storage unit at a time.

9. The process of claim 2, in a system in which multiple clients access the storage units, further comprising ensuring that each storage unit sends data to only one client at a time and each client requests data from only one storage unit at a time.

10. The process of claim 1, in a system in which multiple clients access the storage units, further comprising ensuring that each storage unit sends data to only one client at a time and each client requests data from only one storage unit at a time.

11. A client system for transferring temporal media data over a network from a plurality of storage units for playback on the client system, wherein the temporal media data is divided into segments distributed over the plurality of storage units, wherein each storage unit has persistent storage and one or more buffers for storing data read from persistent storage for transmission over the network, wherein the client system comprises:

a sequence of playback buffers, wherein each playback buffer temporarily stores a segment of the temporal media data before playback, and wherein data in the sequence of playback buffers is played back according to the sequence of the playback buffers, such that each playback buffer has a playback time, means for issuing requests to the storage units to read segments of the temporal media data from the persistent storage into the one or more buffers on the storage units;

means for ordering empty playback buffers in the sequence of playback buffers by playback time and whether data for placement in each playback buffer is expected to be available in the one or more buffers in the storage units;

means for selecting the playback buffer with the earliest playback time and for which the data for placement in the playback buffer is expected to be available in the one or more buffers in the storage units;

means for accessing the storage units for the data for placement in the selected playback buffer; and means for controlling the means for issuing, ordering, selecting and accessing during playback.

12. The client system of claim 11, wherein the segments of the temporal media data are stored nonsequentially on the storage units.

13. The client system of claim 12, wherein each segment of the temporal media data is stored on one of the storage units and a copy of the segment is stored on another of the storage units, the client system further comprising, for each segment, means for selecting one of the storage units.

14. The client system of claim 13, wherein each storage unit includes a queue of requests and the selected storage unit is the storage unit with approximately the shortest queue of requests.

15. The client system of claim 14, in a system in which multiple clients access the storage units, further comprising means for ensuring that each storage unit sends data to only one client at a time and each client requests data from only one storage unit at a time.

16. The client system of claim 11, wherein each segment of the temporal media data is stored on one of the storage units and a copy of the segment is stored on another of the storage units, the client system further comprising, for each segment, means for selecting one of the storage units.

17. The client system of claim 16, wherein each storage unit includes a queue of requests and the selected storage unit is the storage unit with approximately the shortest queue of requests.

18. The client system of claim 17, in a system in which multiple clients access the storage units, further comprising means for ensuring that each storage unit sends data to only one client at a time and each client requests data from only one storage unit at a time.

19. The client system of claim 12, in a system in which multiple clients access the storage units, further comprising means for ensuring that each storage unit sends data to only one client at a time and each client requests data from only one storage unit at a time.

20. The client system of claim 11, in a system in which multiple clients access the storage units, further comprising means for ensuring that each storage unit sends data to only one client at a time and each client requests data from only one storage unit at a time.

* * * * *